(12) United States Patent
Trivedi et al.

(10) Patent No.: US 12,235,003 B2
(45) Date of Patent: Feb. 25, 2025

(54) METHOD AND SYSTEM FOR PREDICTING RESPONSE AND BEHAVIOR ON CHATS

(71) Applicant: SAMSUNG ELECTRONICS CO., LTD., Suwon-si (KR)

(72) Inventors: Jay Ketankumar Trivedi, Gujarat (IN); Shashi Singh, Uttarakhand (IN); Pankaj Tanwar, Himachal Pradesh (IN); Sonal Jain, Gujarat (IN); Rohit Kumar, Bihar (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 17/875,567

(22) Filed: Jul. 28, 2022

(65) Prior Publication Data

US 2023/0107375 A1 Apr. 6, 2023

Related U.S. Application Data

(63) Continuation of application No. PCT/KR2022/010121, filed on Jul. 12, 2022.

(30) Foreign Application Priority Data

Sep. 21, 2021 (IN) .............................. 202111042752

(51) Int. Cl.
*G06F 15/16* (2006.01)
*F24F 11/46* (2018.01)
(Continued)

(52) U.S. Cl.
CPC .............. *F24F 11/46* (2018.01); *F24F 11/56* (2018.01); *F24F 11/80* (2018.01); *H04L 51/02* (2013.01);
(Continued)

(58) Field of Classification Search
CPC .. F24F 11/46; F24F 11/80; F24F 11/56; F24F 2110/10; H04L 51/216; H04L 51/02
(Continued)

(56) References Cited

U.S. PATENT DOCUMENTS 9,092,742 B1 7/2015 Zeng et al.
9,509,645 B2 11/2016 Lim
(Continued)

FOREIGN PATENT DOCUMENTS

JP 2020-512609 4/2020
KR 10-1051541 7/2011
(Continued)

OTHER PUBLICATIONS

Sofershtein (Year: 2015).*
(Continued)

*Primary Examiner* — Imad Hussain
(74) *Attorney, Agent, or Firm* — Nixon & Vanderhye P.C.

(57) ABSTRACT

Provided is a system for predicting a response of a user in a multi-user environment. The system includes a display engine configured to display a user interface (UI) on a display screen for inputting a message corresponding to received messages from one or more contacts, a first processing engine configured to generate a list of correlated candidate messages associated with an input message using received messages, a second processing engine configured to predict a set of correlated candidate messages relevant to the input message from the list of correlated candidate messages, and a third processing engine configured to generate a priority list of candidate messages including the predicted set of correlated candidate messages. The display engine displays, on the display screen, at least one of one or more appropriate candidate messages based on a priority
(Continued)

associated with the appropriate candidate messages in the generated priority list of candidate messages.

20 Claims, 18 Drawing Sheets

(51) Int. Cl.
    *F24F 11/56*     (2018.01)
    *F24F 11/80*     (2018.01)
    *H04L 51/02*     (2022.01)
    *H04L 51/216*     (2022.01)
    *F24F 110/10*     (2018.01)

(52) U.S. Cl.
    CPC ......... *H04L 51/216* (2022.05); *F24F 2110/10* (2018.01)

(58) Field of Classification Search
    USPC .......................................................... 709/206
    See application file for complete search history.

(56) References Cited

U.S. PATENT DOCUMENTS

| | | | |
|---|---|---|---|
| 9,514,742 | B2 | 12/2016 | Lee et al. |
| 9,674,132 | B1 | 6/2017 | Zhang et al. |
| 9,727,204 | B2 | 8/2017 | Yoon et al. |
| 10,129,199 | B2 | 11/2018 | Abou Mahmoud et al. |
| 10,862,834 | B2 | 12/2020 | Zhou et al. |
| 2007/0239637 | A1 | 10/2007 | Paek et al. |
| 2010/0088302 | A1 | 4/2010 | Block |
| 2014/0088944 | A1 | 3/2014 | Natarajan et al. |
| 2015/0195220 | A1* | 7/2015 | Hawker ................ H04L 51/216 707/723 |
| 2016/0241494 | A1 | 8/2016 | Badge et al. |
| 2017/0185581 | A1* | 6/2017 | Bojja ................ G06V 30/19173 |
| 2017/0243134 | A1* | 8/2017 | Housman ................ G06N 7/01 |
| 2018/0089588 | A1* | 3/2018 | Ravi ........................ G06F 7/08 |
| 2018/0270183 | A1 | 9/2018 | Wei |
| 2018/0329982 | A1 | 11/2018 | Patel et al. |
| 2019/0207877 | A1* | 7/2019 | Chung .................. G06N 3/006 |
| 2020/0012718 | A1* | 1/2020 | Kung ..................... G06N 20/00 |
| 2020/0073942 | A1* | 3/2020 | Ciano .................... G06F 40/30 |
| 2020/0151620 | A1* | 5/2020 | Chao ................... G06N 3/084 |
| 2020/0356857 | A1 | 11/2020 | Lee et al. |
| 2021/0004437 | A1* | 1/2021 | Zhang ................. G06F 40/205 |

FOREIGN PATENT DOCUMENTS

| | | |
|---|---|---|
| KR | 10-2013-0128717 | 11/2013 |
| KR | 10-2014-0113067 | 9/2014 |
| KR | 10-2017-0029833 | 3/2017 |
| KR | 10-2052033 | 1/2020 |
| KR | 10-2103809 | 4/2020 |
| KR | 10-2020-0101537 | 8/2020 |

OTHER PUBLICATIONS

Indian Office Action issued Jul. 24, 2023 in corresponding Indian Patent Application No. 202111042752.
Search Report dated Oct. 25, 2022 issued in International Patent Application No. PCT/KR2022/010121.
[Online], www.thestudentroom.co.uk/showthread.php?t=349www.thestudentroom.co.uk/showthread.php?t=3492869, retrieved Jul. 27, 2022, one (1) page.

* cited by examiner

METHOD AND SYSTEM FOR PREDICTING RESPONSE AND BEHAVIOR ON CHATS

CROSS-REFERENCE TO RELATED APPLICATIONS

This application is a continuation of International Application No. PCT/KR2022/010121 designating the United States, filed on Jul. 12, 2022, in the Korean Intellectual Property Receiving Office, and claiming priority to Indian patent application No. 202111042752, filed on Sep. 21, 2021, in the Indian Patent Office, the disclosures of which are incorporated by reference herein in their entireties.

BACKGROUND

Field

The disclosure relates to a method and system for response/behavior Prediction on chats. For example, the disclosure relates to a method and system for predicting a response of a user in a multi-user environment or a single user environment.

Description of Related Art

Recently, the majority of digital communication takes place in the form of text, either it takes place via email or various chatting platforms. Texting in group chats on various chatting platforms can be very difficult if people send a lot of messages and the message relevant to a user gets lost.

Further, in the case of multi-window chatting platforms, the users using a multi-window chatting platform may also face the issue of sending a text to the wrong group as some other window might come in focus at the time of selecting the send option to send the text.

As an example, as shown in FIGS. 1A and 1B, it is difficult for the user to find a message to reply every time in continuous chats due to bulk amount of messages is being sent by other users. In such a case, the user has to manually search for the message which has not received the response, and also the user might feel fear of missing a chat that needs urgent response. Furthermore, In case when there are multiple open chat windows is present, the user may get confused about where to reply first since each of the received chat messages has a different level of importance at a different point of time. Therefore, after opening group chat windows with many messages it may be difficult for the user to find topics of importance.

Additionally, there might also be a case where the user might send a message in the wrong chat window due to the incoming of multiple messages at the same time. As shown in FIG. 2 of the drawings, the user may also send a wrong message in a wrong chat window due to the incoming of many messages at the same time. As an example with reference to FIG. 2 it can be seen that user 206 wanted to send a message to the chat window 200 and by mistake the user 206 has sent that message to the chat window 202.

Therefore, there is a need for a method and system that can solve the above-mentioned problems.

SUMMARY

Embodiments of the disclosure provide a method and system that can predict messages in the group chat which can be a potential query to message typed by the user. The method and system according to various embodiments of the disclosure can also predict a chat window and the messages in the chat window which can be a potential query to response typed by the user in case of multi-window chats, and a correct candidate for a command generated by the user in case of multi-appliance IoT Environment.

According to various example embodiments, a method for predicting a response of a user in a multi-user environment is provided. The method comprises: displaying a user interface (UI) on a display screen for inputting a message corresponding to one of at least one received message or a group of received messages from one or more contacts in one of a single window environment or a multi-window environment; generating a list of correlated candidate messages associated with an input message based on one of the at least one received message or the group of received messages; predicting a set of correlated candidate messages relevant to the input message from the list of correlated candidate messages; generating a priority list of candidate messages including the predicted set of correlated candidate messages; and displaying at least one of an appropriate candidate message or a list of the appropriate candidate messages on the display screen based on a priority associated with the appropriate candidate messages in the generated priority list of candidate messages.

According to various example embodiments, the disclosure provides a system for predicting a response of a user in a multi-user environment. The system includes: a display engine configured to display a user interface (UI) on a display screen for inputting a message corresponding to one of at least one received message or a group of received messages from one or more contacts in one of a single window environment or a multi-window environment; a first processing engine configured to generate a list of correlated candidate messages associated with an input message based on one of the at least one received message or the group of received messages; a second processing engine configured to predict a set of correlated candidate messages relevant to the input message from the list of correlated candidate messages a third processing engine configured to generate a priority list of candidate messages including the predicted set of correlated candidate messages, wherein the display engine is further configured to display, on the display screen, at least one of an appropriate candidate message or a list of the appropriate candidate messages based on a priority associated with the appropriate candidate messages in the generated priority list of candidate messages.

To further clarify the advantages and features of the present disclosure, a more particular description will be rendered by reference to various example embodiments thereof, which re illustrated in the appended drawings. It is appreciated that these drawings depict example embodiments of the disclosure and are therefore not to be considered limiting its scope. The disclosure will be described and explained with additional specificity and detail with the accompanying drawings.

BRIEF DESCRIPTION OF THE DRAWINGS

The above and other features, aspects, and advantages of certain embodiments of the present disclosure will be more apparent from the following detailed description, taken in conjunction with the accompanying drawings in which like characters represent like parts throughout the drawings, wherein.

Figure 1A:
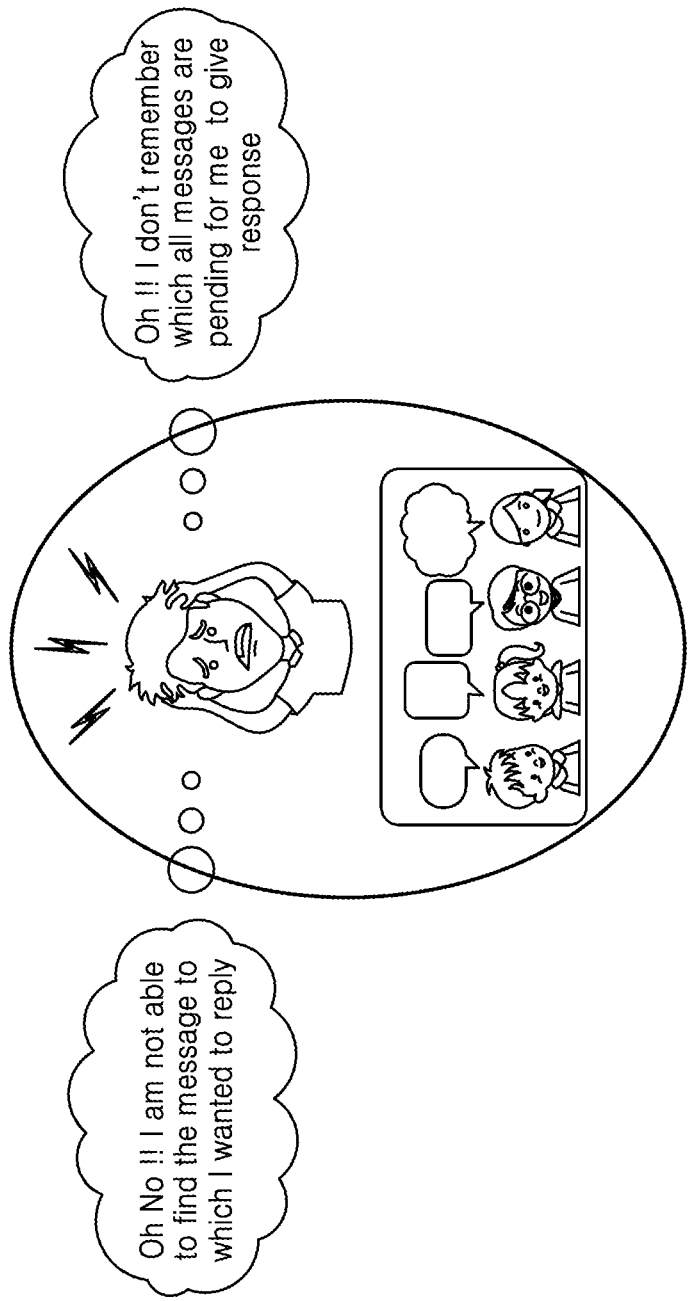
FIGS. 1A and 1B are diagrams illustrating an example of problems in a group chat platform and a multi-window chat platform, in accordance with an existing solution.
Figure 1B:
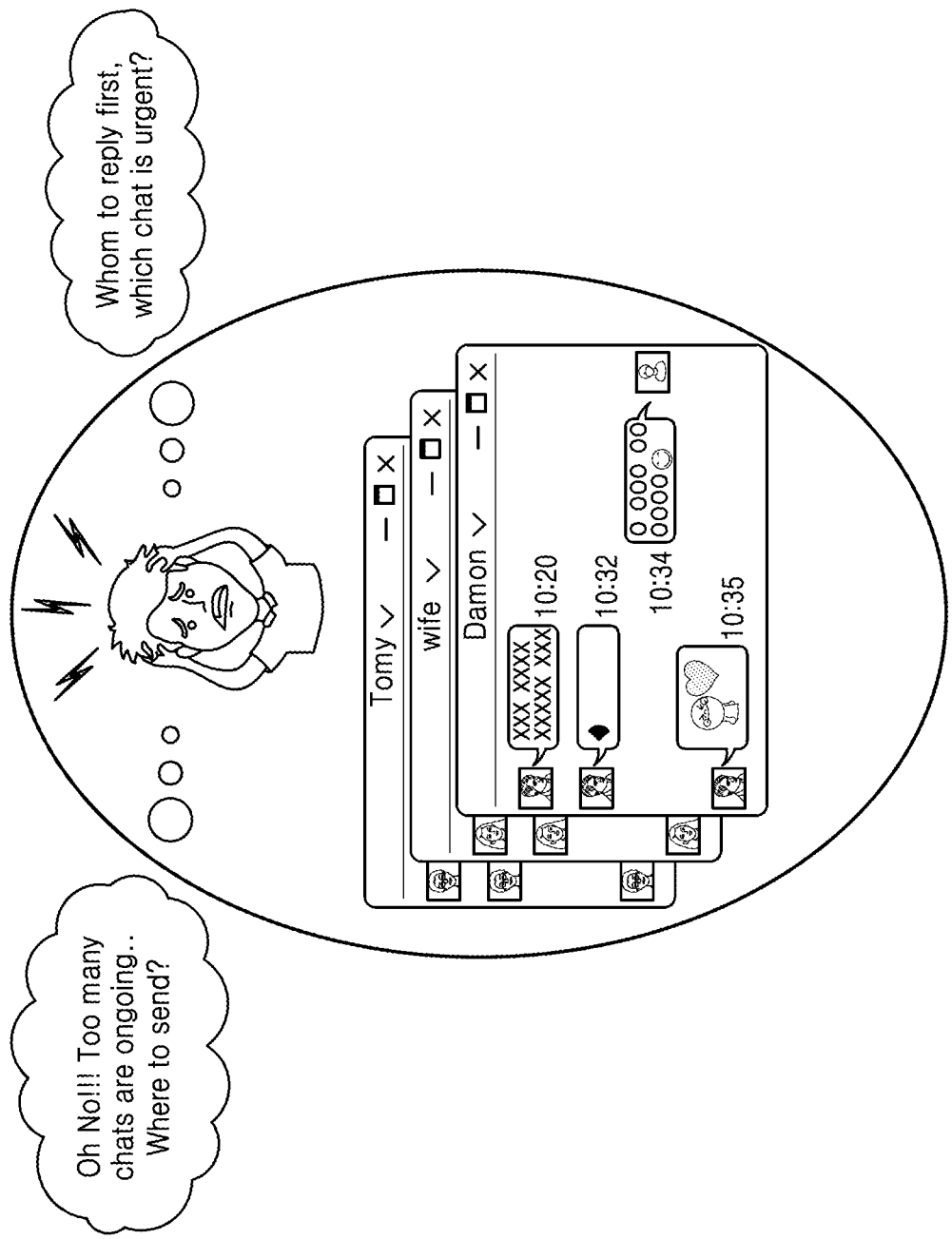
Figure 2:
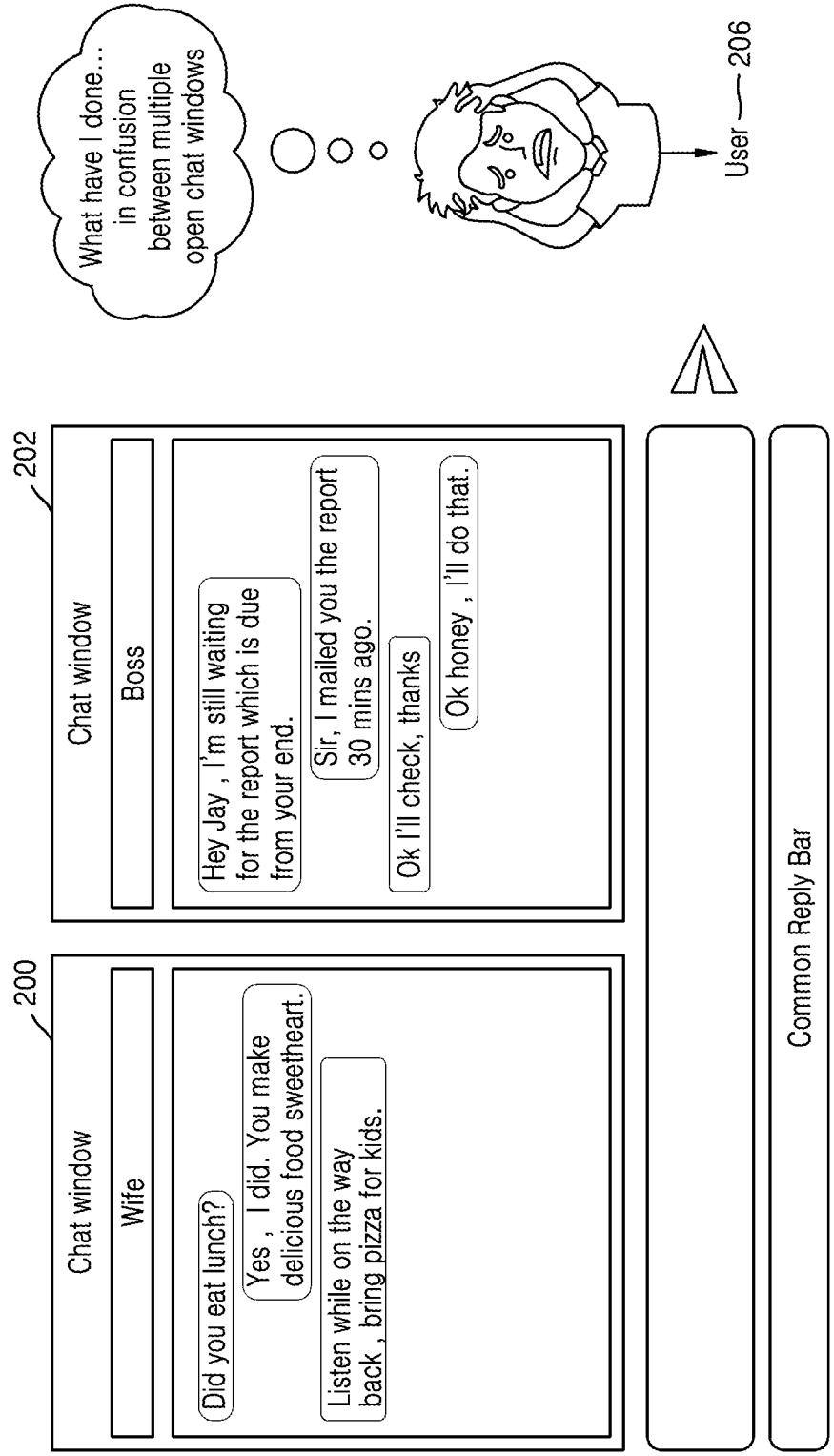
FIG. 2 is a diagram illustrating another example of a problem in the multi-window chat platform, in accordance with an existing solution.

Further, skilled artisans will appreciate that elements in the drawings are illustrated for simplicity and may not have been necessarily been drawn to scale. For example, the flowcharts illustrate the method in terms various example operations involved to help to improve understanding of aspects of the present disclosure. Furthermore, in terms of the construction of the device, one or more components of the device may have been represented in the drawings by conventional symbols, and the drawings may show various details that are pertinent to understanding the various example embodiments of the present disclosure so as not to obscure the drawings with details that will be readily apparent to those of ordinary skill in the art having the benefit of the description herein.

DETAILED DESCRIPTION

It should be understood at the outset that although illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the example design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating various embodiments and their specific features and elements and does not limit, restrict, or reduce the spirit and scope of the claims or their equivalents.

For example, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and must not be taken to exclude the possible removal of one or more of the listed features and elements, unless otherwise stated with the limiting language "must comprise" or "needs to include."

Whether or not a certain feature or element was limited to being used once, either way, it may still be referred to as "one or more features" or "one or more elements" or "at least one feature" or "at least one element." Furthermore, the use of the terms "one or more" or "at least one" feature or element do not preclude there being none of that feature or element unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having ordinary skill in the art.

Embodiments of the present disclosure will be described in greater detail below with reference to the accompanying drawings.

Figure 3:
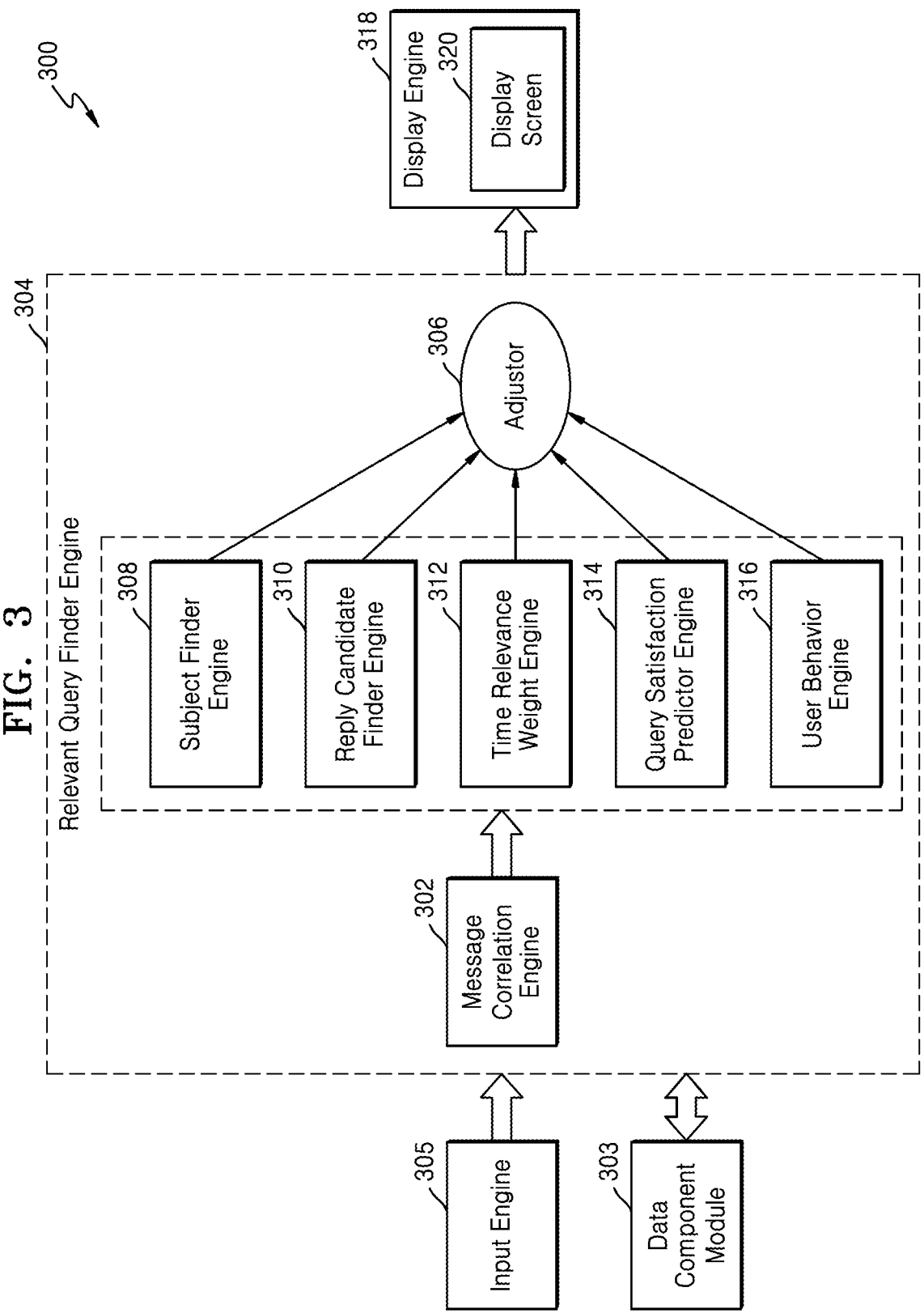
FIG. 3 is a block diagram illustrating an example configuration of a system for prediction of user's response in a multi-user environment or a single user environment, according to various embodiments.

FIG. 3 is a block diagram illustrating an example configuration of a system 300 for the prediction of user's response in the multi-user environment, according to various embodiments. In an embodiment, the system 300 includes a Message Correlation Engine (e.g., including various processing circuitry and/or executable program instructions) 302, a Data Component Module (e.g., including various processing circuitry and/or executable program instructions) 303, a Relevant Query Finder Engine (e.g., including various processing circuitry and/or executable program instructions) 304, and an adjustor (e.g., including various processing circuitry and/or executable program instructions) 306. Each of these components, the Message Correlation Engine 302, the Relevant Query Finder Engine 304, and the adjustor 306 may correspond to a machine learning engine and can utilize various machine learning models for the information processing. The system 300 further includes an Input Engine (e.g., including various processing circuitry and/or executable program instructions) 305 and a Display Engine (e.g., including various processing circuitry and/or executable program instructions) 318 including a display screen 320. The Input Engine 305 and the Display Engine 318 are communicatively coupled together to receive input message from a user on the display screen 320 via an input interface of the input engine 305 while replying to a message received from the other users in a multi-window environment or a single window environment.

The Display Engine 318 is configured to display a user interface (UI) on the display screen 320 for inputting a message corresponding to one of at least one received message or a group of received messages from one or more contacts in one of the single window environment or the multi-window environment. Examples of the display screen 320 may include but are not limited to, a smartphone screen, a smart television screen, and a tablet screen. The display screen 320 may be Light Emitting Diode (LED), Liquid Crystal Display (LCD), Organic Light Emitting Diode (OLED), Active-Matrix Organic Light Emitting Diode (AMOLED), or Super Active-Matrix Organic Light Emitting Diode (SAMOLED) screen. It will be understood to a person of ordinary skill in the art that the disclosure is not limited to any type or any resolution of the display screen 320.

The Data Component Module 303 refers to a data source corresponding to the input engine 305. The Data Component Module 303 keeps a record of received input data and can import application data from an application server to be used for machine learning platform by the Message Correlation Engine 302 and the Relevant Query Finder Engine 304. The Data Component Module 303 may also sample subsets of training data using a pre-defined machine learning technique. In various embodiments, the Data Component Module 303 may be excluded from the system 300 and the received input data, and the application data may be directly inputted to the Message Correlation Engine 302 and the Relevant Query Finder Engine 304.

The Message Correlation Engine 302 generates a list of correlated candidate messages associated with user's input message based on one of the at least one received message or the group of received messages. The Message Correlation Engine 302 can also be referred to as "a first processing engine" without deviating from the scope of the disclosure.

The Data Component Module 303 may also keep records and details of the received messages or the group of received messages in a form of a chat corpus, a chat weight table, and a user behavior table (to be described later in the present disclosure).

The Relevant Query Finder Engine 304 predicts a set of correlated candidate messages relevant to the user's input message from the list of correlated candidate messages generated by the Message Correlation Engine 302. The Relevant Query Finder Engine 304 can also be referred to as "a second processing engine" without deviating from the scope of the disclosure.

The adjustor 306 generates a priority list of candidate messages including the predicted set of correlated candidate messages predicted by the Relevant Query Finder Engine 304. The adjustor 306 can also be referred to as "a third processing engine" without deviating from the scope of the disclosure.

Further, in an embodiment, the Display Engine 318 receives output data from the adjustor 306 and can also be configured to display at least one of an appropriate candidate message or a list of the appropriate candidate messages on the display screen 320 according to a priority associated with the appropriate candidate messages in the generated priority list of candidate messages.

Figure 4:
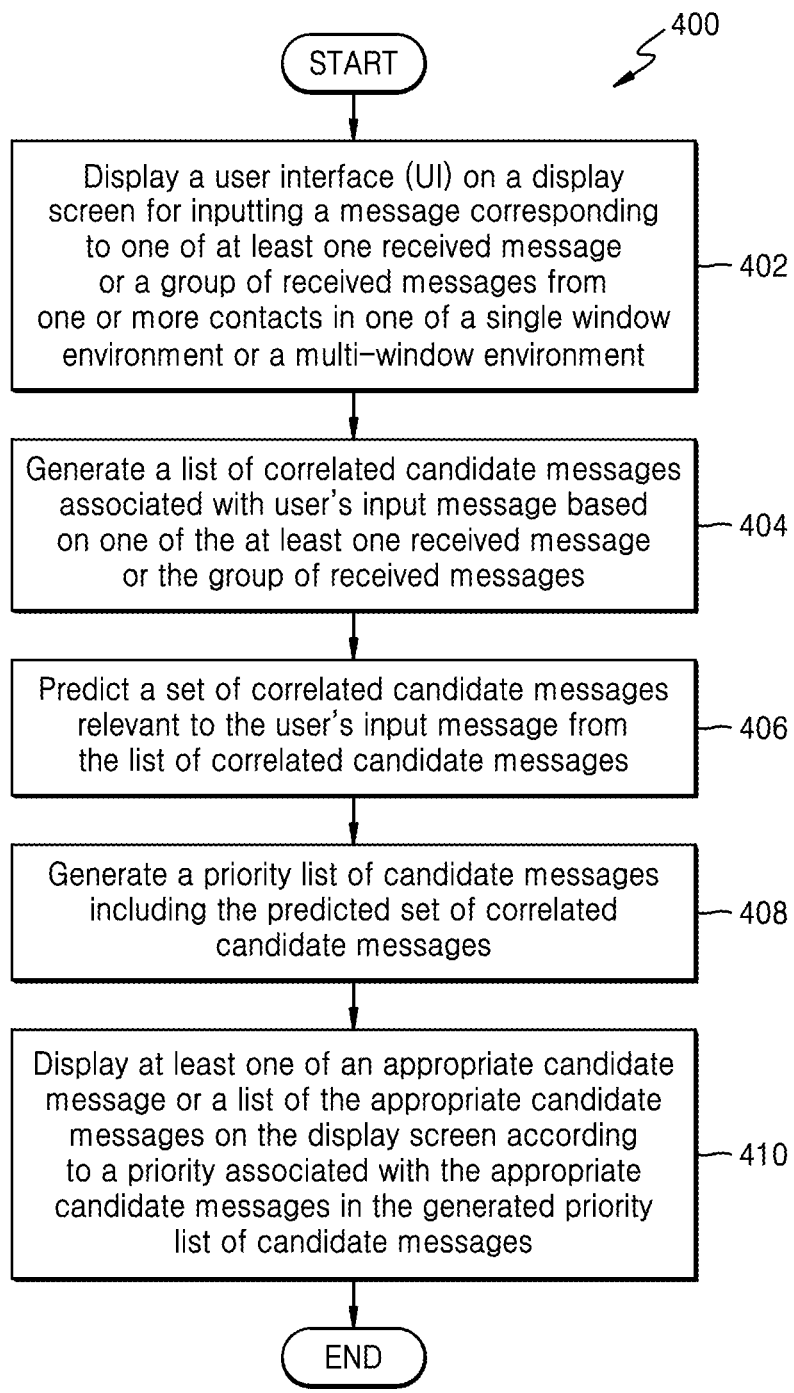
FIG. 4 is a flowchart illustrating an example method for the prediction of user's response in the multi-user environment or the single user environment, according to various embodiments.

Referring now to FIG. 4 a flowchart illustrating an example for the prediction of user's response in the multi-user environment or the single user environment, according to various embodiments is provided. FIG. 4 is a flowchart illustrating an example method 400 performed by the system 300 of FIG. 3.

The method 400 comprises displaying (at operation 402) displaying the UI on the display screen 320 for inputting the message corresponding to one of the at least one received message or a group of received messages from the one or more contacts in one of the single window environment or the multi-window environment. As an example, the Display Engine 318 displays the UI on the display screen 320 and the user starts typing a message in an input interface on the display screen in response to the messages received by the user from the one or more contacts in the single window environment or the multi-window environment.

At operation 404, the method 400 comprises generating the list of correlated candidate messages associated with the user's input message based on one of the at least one received message or the group of received messages. As an example, the Message Correlation Engine 302 generates the list of correlated candidate messages that are related to the message inputted by the user in the input interface using the at least one message received by the user from the one or more contacts or the group of messages received by the user from the one or more contacts.

At operation 406, the method 400 comprises predicting the set of correlated candidate messages relevant to the user's input message from the list of correlated candidate messages generated by the Message Correlation Engine 302. As an example, the Relevant Query Finder Engine 304 predicts the set of correlated candidate messages in the list of correlated candidate messages that are related and relevant to the message inputted by the user in the input interface.

At operation 408, the method 400 comprises generating the priority list of candidate messages including the predicted set of correlated candidate messages that is predicted by the Relevant Query Finder Engine 304. As an example, the adjustor 306 generates the priority list of candidate messages that includes the predicted set of correlated candidate messages along with specific priority assigned to a corresponding predicted set of correlated candidate messages.

At operation 410, the method 400 comprises displaying at least one of the appropriate candidate message or the list of the appropriate candidate messages on the display screen 320 according to the priority associated with the appropriate candidate messages in the generated priority list of candidate messages. As an example, the Display Engine 318 displays at least one of the appropriate candidate message or the list of the appropriate candidate messages on the display screen 320 based on the priority of the appropriate candidate messages in the priority list of candidate messages.

Referring back to FIG. 3, the functions performed by the Message Correlation Engine 302 to generate the list of correlated candidate messages will be described in greater detail below with reference to FIGS. 5 and 6.

The Message Correlation Engine 302 generates a chat corpus of messages of each of the personal and the group chat. The chat corpus includes information corresponding to at least one of, but not limited to, message ID and sender ID, message description corresponding to the at least one message ID and sender ID, and a timestamp corresponding to the at least one message ID and sender ID. In particular, the Message Correlation Engine 302 generates a separate corpus table for every individual and group chat by determining a relativeness between user input and the chat corpus on a basis of a pre-trained dataset. The Chat corpus is a database of chats and maintains a unique document for each individual and group chat. Each of the unique documents contains data like but is not limited to chat message, sender name, associated time stamp, group name, group size, and information associated with the user profile. An example of the information in the chat corpus with reference to a friend group corpus is shown below in Table 1. The example of the chat corpus as shown in Table 1 is shown for ease of explanation and is not limited to the friend group corpus and the information included in the friend group corpus. The chat corpus can include information with reference to any type of group corpus.

TABLE 1

| Message_ID | Sender_ID | Message Description Text | Time Stamp |
|---|---|---|---|
| 1 | Jack_11 | Hey Mike, what an amazing football game it was!! | 20 Jan. 2020 19:00:05 |
| 2 | Mike_22 | Yes, It was an extraordinary football match. | 20 Jan. 2020 19:00:10 |
| 3 | Sam_33 | Hey, what are you guys ordering for lunch? | 21 Jan. 2020 11:00:00 |
| 4 | Joy_44 | I have ordered burger. | 21 Jan. 2020 11:00:01 |
| 5 | Mike_22 | Will you play cricket with me jack? | 21 Jan. 2020 16:00:01 |

Figure 5:
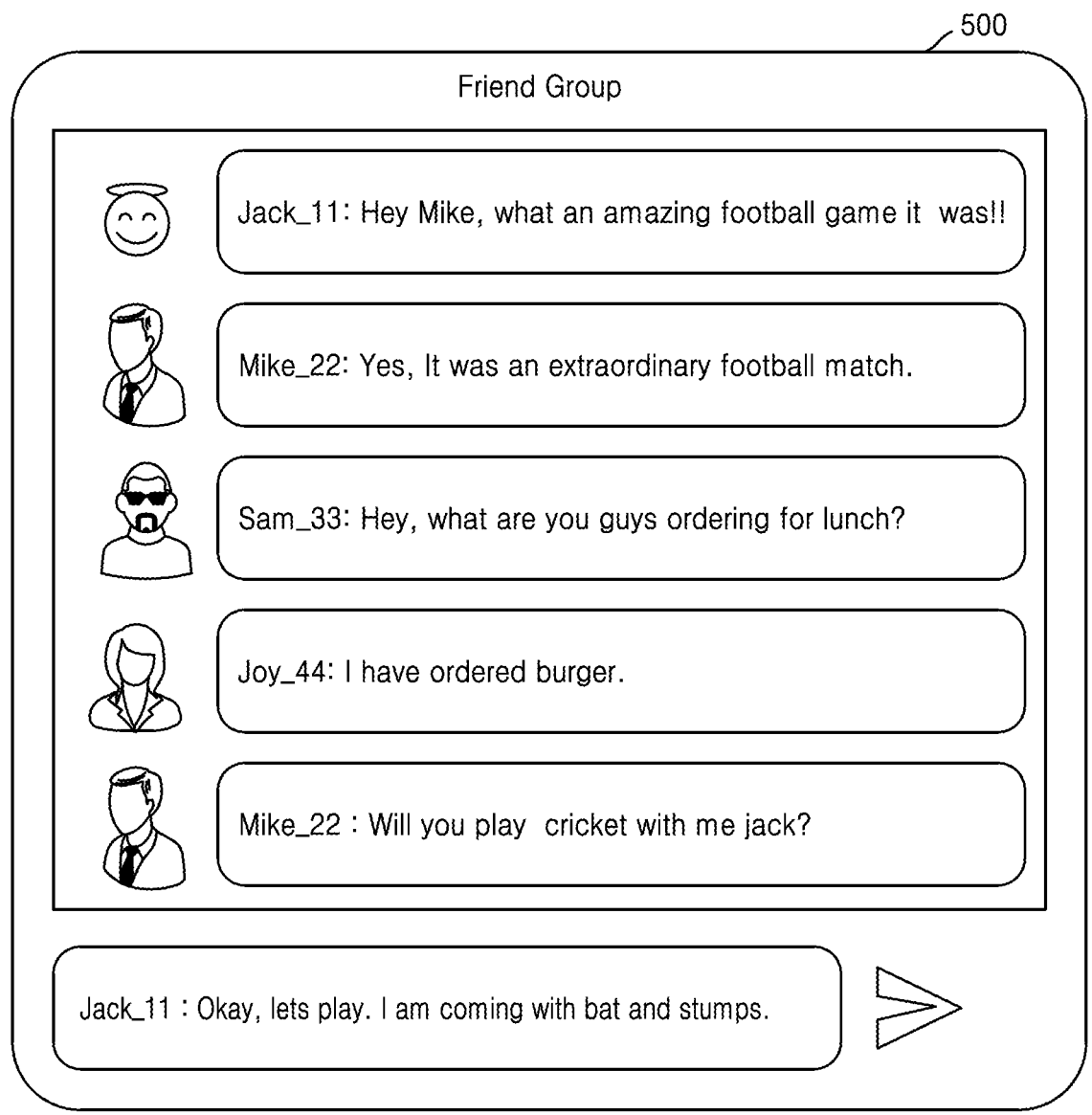
FIG. 5 is a diagram illustrating an example of a chat corpus with reference to the friend group corpus, according to various embodiments.
Figure 6:
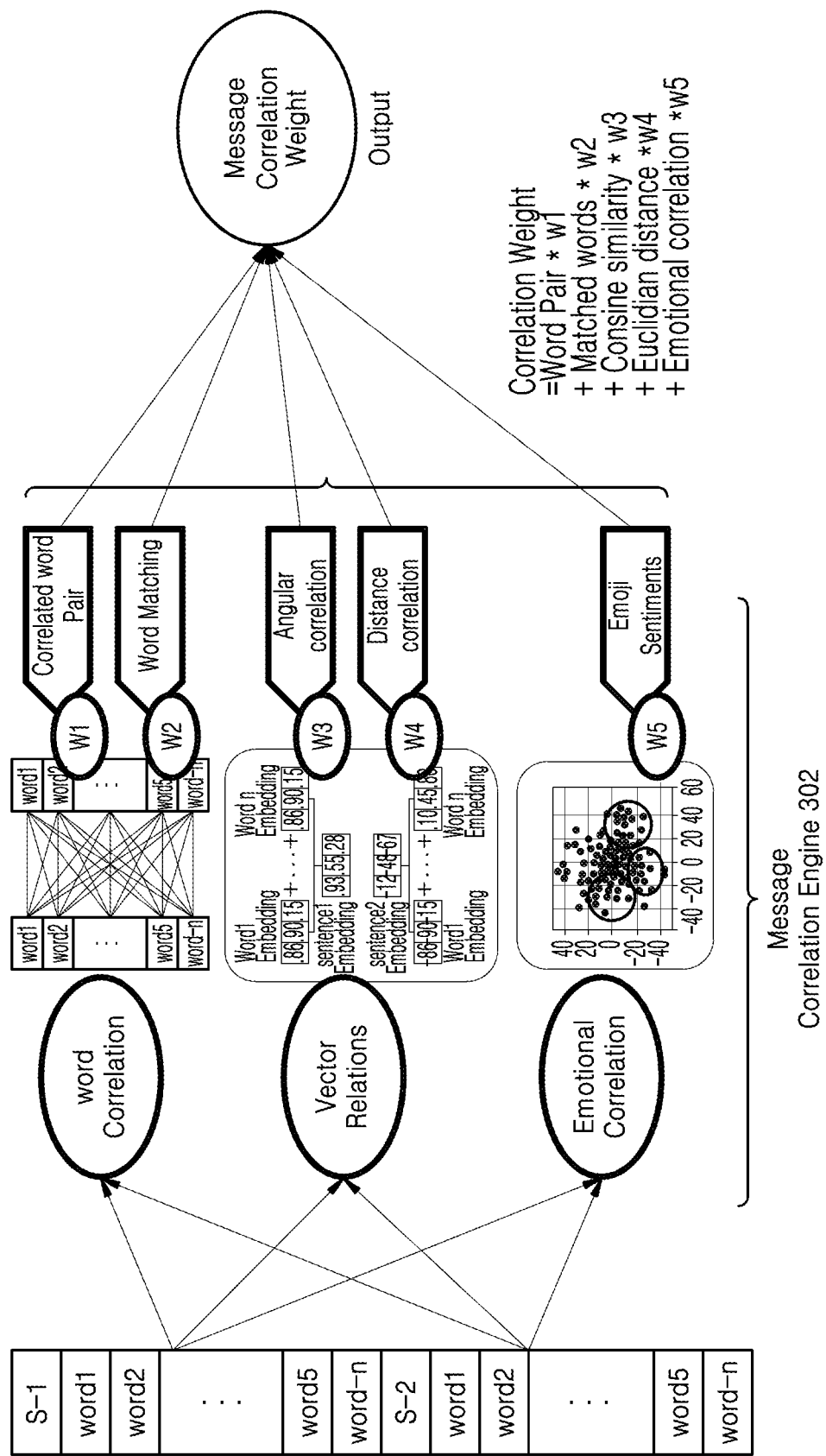
FIG. 6 is a diagram illustrating an example of calculating the message correlation weight by the Message Correlation Engine of FIG. 3, according to various embodiments.

FIG. 5 is a diagram illustrating an example of a chat corpus with reference to the friend group corpus, according to various embodiments. As shown in FIG. 5, there are four friends with different sender_ID chatting with each other in the friend group 500. According to the example shown in FIG. 5, each of the messages sent by the individuals with a specific sender in the friend group 500 is captured and a corpus table corresponding to the friend group 500 is generated (as shown in Table 1) by the Message Correlation Engine 302 including the message ID and the sender ID of the individuals in the friend group 500, message description corresponding to each of the message ID and the sender ID, and a timestamp corresponding to each of the message ID and the sender ID.

The process involved in the calculation of the message correlation weight and the generation of the list of the correlated candidate messages will be explained in greater detail below with reference to FIG. 6. FIG. 6 is a diagram illustrating an example of calculating the message correlation weight by the Message Correlation Engine 302 of FIG. 3, according to various embodiments.

The Message Correlation Engine 302 correlates the at least one received message or the group of received messages with the user's input message based on a relationship between token features, word embedding, and semantics of the user's input message and the at least one received message or the group of received messages. In particular, each of the received messages or the group of received messages includes one or more sentences including one or more words, for example, S-1 including word1, word2 . . . , word5, . . . , word-n (as shown in FIG. 6), and the user's input message may also include one or more sentence including one or more words, for example, S-2 including word1, word2 . . . , word5, . . . , word-m (as shown in FIG. 6). The Message Correlation Engine 302 correlates these words with each other based on various relationship parameters such as word correlation, vector relations, and emotional correlation using the token features, the word embedding, and the semantics of the corresponding one or more words of the user's input message and the corresponding one or more words of the received message or the group of received messages.

Further, the Message Correlation Engine 302 calculates the message correlation weight of the at least one received message or each message in the group of received messages based on the correlation. As an example, weights W1, W2, W3, W4, and W5 is calculated (as shown in FIG. 6) respectively for the at least one received message or the group of received messages based on the result of the correlation process, for example, using Correlated word pair, matched words, angular correlation, distance correlation, and emoji sentiments between the user's input message and the at least one received message or each message in the group of received messages. In particular, the Message Correlation Engine 302 generates various message information in form of tables and databases using the correlation process, for example, word correlation table, sentence embedding table, message correlation dataset, word embedding table, and emotional correlation table. An example illustration of each of these tables and datasets is shown below as an example with respect to example messages of the friend group 500 of FIG. 5. The below-mentioned tables (Table 2 through Table 5) are shown for ease of explanation and are not limited to the information included in these Tables. These tables may include any other information with reference to the chat corpus.

TABLE 2

Word Correlation Table

| | Bat | Stumps | Football | Cricket | Play |
|---|---|---|---|---|---|
| Bat | 1 | 0.2 | 0 | 0.9 | 0.81 |
| Stumps | | 1 | 0 | 0.4 | 0.2 |
| Football | | | 1 | 0.9 | 0.87 |
| Game | | | | 1 | 0.9 |

The Message Correlation Engine 302 generates a word correlation table by performing unsupervised learning over a large chat dataset. A high correlation value is allocated to the words with a high correlation with the user's input message reply. For example, the bat has more correlation with cricket, therefore a high correlation value is allocated to the word "bat" (as shown in Table 2).

TABLE 3

Word Correlation Table

| | Bat | Stumps | Football | Cricket | Play |
|---|---|---|---|---|---|
| Belong to cricket | 0.9 | 0.9 | −0.9 | 1 | 0.8 |
| Multiplayer game | 0.95 | 0.7 | 1 | 1 | 0.8 |
| Is outdoor | 0.7 | 0.8 | 1 | 1 | 0.5 |

According to the word Embedding table (Table 3) as shown above, the Message Correlation Engine 302 maps each of the words in the user's input message to a vector using a dictionary.

TABLE 4

| | Okay, lets play. I am coming with bat and stumps. | | | | Will you play cricket with me jack. | | |
|---|---|---|---|---|---|---|---|
| | play | Bat ... | Stumps | Sentence Embedding (Vector1) | Play | Cricket ... | Sentence Embedding (Vector2) |
| Belong to cricket (x) | 0.8 | 0.9 | 0.9 | 2.6 | 0.8 | 1 | 1.8 |
| Multiplayer game (y) | 0.5 | 0.95 | 0.7 | 2.45 | 0.8 | 1 | 1.8 |
| Is outdoor (z) | 0.5 | 0.7 | 0.8 | 2 | 0.5 | 1 | 1.5 |

An example table of sentence embedding for calculating the message correlation weight of the at least one received message or each message in the group of received messages is shown in Table 4.

TABLE 5

Message Correlation Dataset

| Correlated words pair count ratio | Matched Words | Vector Cosine Similarity | Emotional Correlation | Euclidian Distance | Correlation Weight |
|---|---|---|---|---|---|
| 23.53 | 1 | 0.99942 | 0 | 2.86574 | 90 |

Accordingly, the Message Correlation Engine 302 assigns a particular weight value to each word of the received message or the group of received messages, and finally calculates a value of the message correlation weight corresponding to the received message or each of the group of received messages using the particular weight value of each of the correlated words pair count ratio, the matched words, the vector cosine similarity, the emotional correlation, and the Euclidian distance between the words (as shown in example Table 5).

Furthermore, subsequent to the calculation of message correlation weight, the Message Correlation Engine 302 classifies the messages with higher correlation weight among the received message or the group of received messages as the correlated candidate messages based on the calculated correlation weight and a time relevant threshold corresponding to the user's input message. Accordingly, the Message Correlation Engine 302 generates the list of correlated candidate messages based on the classification. In addition, the Message Correlation Engine 302 may also learn and update time relevant threshold in accordance with its backpropagation learning cycle.

The Message Correlation Engine 302 also generates a chat weight table for the correlated candidate messages using the information included in the chat corpus. The chat corpus and the chat weight table include the list of the correlated candidate messages. The chat weight table is a table of messages of chat corpus. Further, certain weights are assigned to each message in the table of messages by various sub-components of the Relevant Query Finder Engine 304 (to be described later). An example of the chat weight table is illustrated below in Table 6 in accordance with the example shown in FIG. 5 of the drawings. The example of the chat weight table as shown in Table 6 is shown for ease of explanation and is not limited to the information included in Table 6. The chat weight table may include any other information with reference to any type of the chat corpus.

TABLE 6

| Message_ID | Subject | Reply Count | Candidate for reply | Time Relevant Weight |
|---|---|---|---|---|
| 1 | [Sports: Football] | 1 | [Mike 94 w, Sam 2 w, Joy 2 w, Jack 2 w] | 20 w |
| 2 | [Sports: Football] | 0 | [Mike 7 w, Sam 7 w, Joy 7 w, Jack 79 w] | 20 w |
| 3 | [Food] | 1 | [Mike 30 w, Sam 10 w, Joy 30 w, Jack 30 w] | 25 w |
| 4 | [Food] | 0 | [Mike 7 w, Sam 79 w, Joy 7 w, Jack 7 w] | 25 w |
| 5 | [Sports: Cricket] | 0 | [Mike 10 w, Sam 2 w, Joy 2 w, Jack 86 w] | 40 w |

Referring back to FIG. 3 of the drawings, the Relevant Query Finder Engine 304 includes a Subject Finder Engine 308, a Reply Candidate Finder Engine 310, a Time Relevance Weight Engine 312, a Query Satisfaction Predictor Engine 314, and a User Behavior Engine 316. A more detailed explanation of the required process for the prediction of the set of correlated candidate messages will be made with reference to the components of the Relevant Query Finder Engine 304.

For the prediction of the set of correlated candidate messages, the Relevant Query Finder Engine 304 is configured to determine a plurality of weights for each of the correlated candidate messages in the generated list of correlated candidate messages based on at least one of a subject of user's input message, user's potential to be a candidate for the reply, a plurality of time attributes, query satisfaction parameters, and behavioral parameters. The plurality of weights includes subject weights, candidate weights, time-relevant weights, query satisfaction weights, and behavioral weights corresponding to the correlated candidate messages.

The Subject Finder Engine 308 of the Relevant Query Finder Engine 304 is configured to determine a subject of the user's input message relevant to each of the correlated candidate messages using a subject predictor machine learning model. Further, the Subject Finder Engine 308 assigns subject weights corresponding to the correlated candidate messages based on a correlation of the determined subject with the correlated candidate messages. In particular, the Subject Finder Engine 308 uses a subject dataset table which is a supervised labeled dataset to prepare a subject correlation table for assigning the subject weights to the correlated candidate messages. The Subject Finder Engine 308 classifies every message of a chat dataset of the chat corpus according to the subject in the messages and labels the chat dataset. This labeled data is further used to make the cluster of messages and further, the subject correlation table is prepared based on a determination that how closely they are discussed in chats.

Now an example process of determining and assigning the subject weight corresponding to the correlated candidate messages by the Subject Finder Engine 308 will be explained in greater detail below with reference to FIG. 7 of the drawings.

Figure 7:
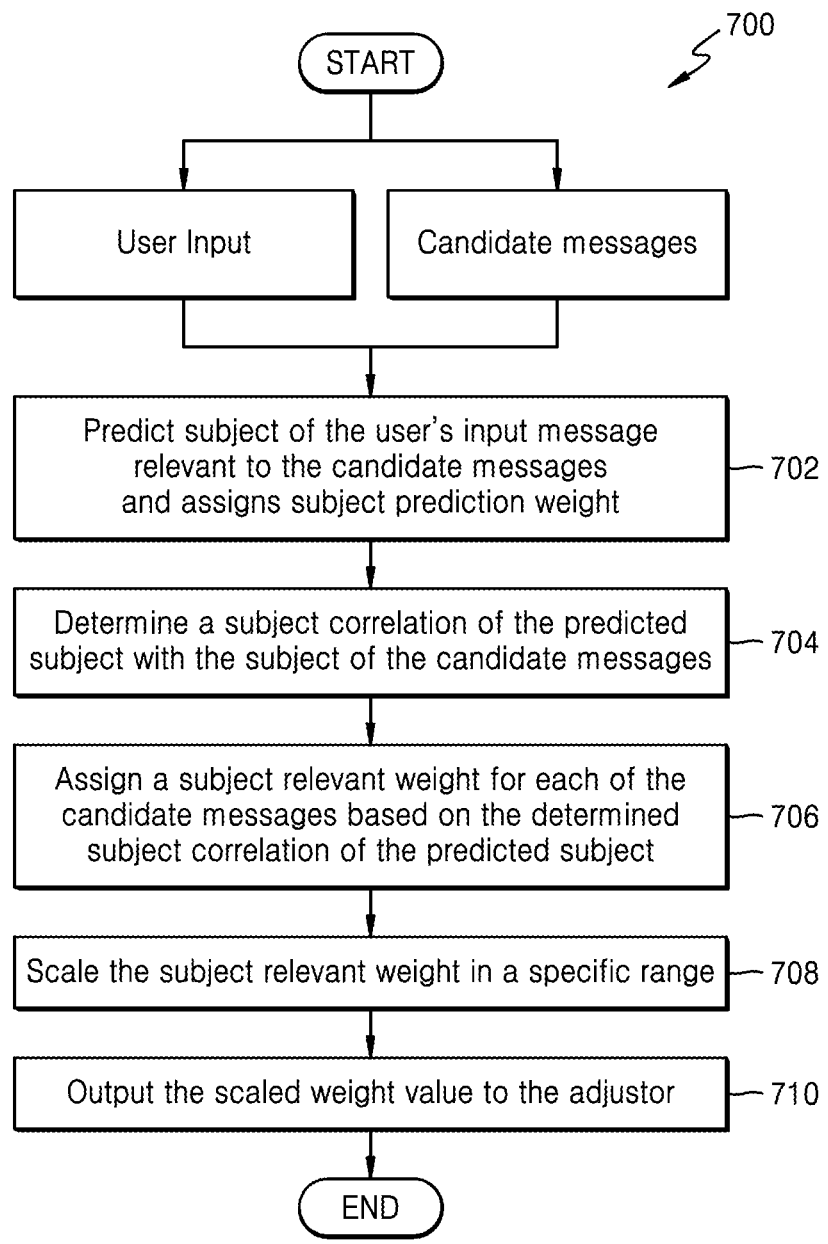
FIG. 7 is a flowchart illustrating an example method of calculating and determining a subject weight for the correlated candidate messages, according to various embodiments.

FIG. 7 is a flowchart illustrating an example method for determining and assigning subject weight for the correlated candidate messages, according to various embodiments. FIG. 7 illustrates an example method 700 for determining and assigning subject weight for the correlated candidate messages.

The method 700 comprises (at operation 702) predicting the subject of the user's input message relevant to the correlated candidate messages using a subject predictor machine learning model and assigning a subject prediction weight to each of the predicted subjects. As an example, the Subject Finder Engine 308 predicts the subject of the user's input message that is relevant to the subject of the correlated candidate messages in the list of the correlated candidate messages generated by the Message Correlation Engine 302.

At operation 704, the method 700 comprises determining a subject correlation of the predicted subject with the subject of the correlated candidate messages. As an example, the Subject Finder Engine 308 determines the correlation between the predicted subject of the user's input message and the subject of the correlated candidate messages.

At operation 706, the method 700 comprises assigning a subject relevant weight for each of the correlated candidate messages based on the determined subject correlation of the predicted subject with the subject of the correlated candidate messages. As an example, the Subject Finder Engine 308 assigning a subject relevant weight to each of the correlated candidate messages based on the determined subject correlation of the predicted subject with the subject of corresponding correlated candidate messages in the list of the correlated candidate messages generated by the Message Correlation Engine 302.

At operation 708, the method 700 comprises scaling the assigned subject relevant weight in a specific range. As an example, the Subject Finder Engine 308 scales the assigned subject relevant weight in a range of 1 to 100.

At operation 710, the method 700 comprises outputting the scaled weight value to the adjustor 306. As an example, the Subject Finder Engine 308 outputs the scaled weight value corresponding to each of the correlated candidate messages to the adjustor 306.

Functions performed by the Reply Candidate Finder Engine 310 for the prediction of the set of correlated candidate messages, will be described in greater detail below with respect to the example FIG. 5.

The Reply Candidate Finder Engine 310 is configured to identify and tag the correlated candidate messages with ranked name entities that can potentially reply to the user's input message based on a plurality of parameters using a supervised machine learning model. The plurality of parameters may include, but is not limited to, user's mention in the group corpus or the chat corpus, user's participation in the group corpus or the chat corpus, and a message type of the corresponding correlated candidate messages. Further, subsequent to the identification and tagging process, the Reply Candidate Finder Engine 310 determines candidate weights for the correlated candidate messages based on the identification and the tagging of the correlated candidate messages. In particular, the Reply Candidate Finder Engine 310 determines candidate weights for each of the candidates in a specific chat group corresponding to a specific candidate message.

The user's mention corresponds to information regarding the mentioning of the group members in the correlated candidate messages. A particular candidate weight regarding the user's mention in the correlated candidate messages can be given as ((user mention/total number of mentions)*100). The user's participation corresponds to the ratio of messages exchanged by a member in a discussion in the group corpus or the chat corpus and can be given as (Number of user messages/total messages) in that group. The message type of the corresponding correlated candidate messages corresponds to a type of message, for example, whether it is a generic greeting message or a reply of another message.

Figure 8:
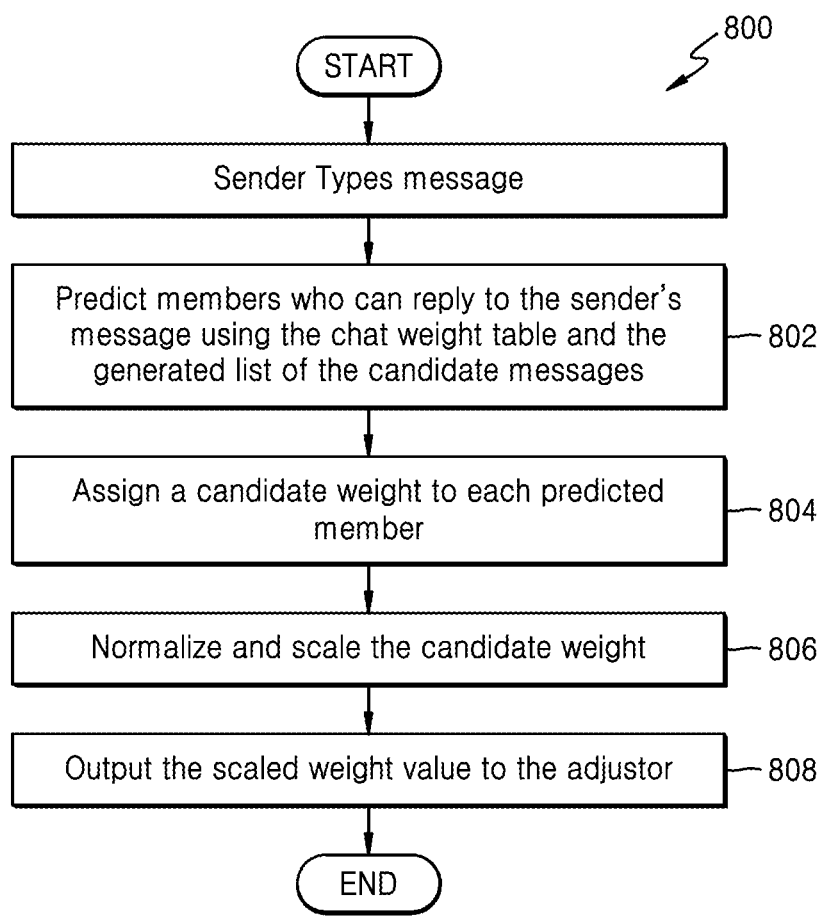
FIG. 8 is a flowchart illustrating an example method of determining candidate weights for the correlated candidate messages, according to various embodiments.

An example process of determining the candidate weights for the correlated candidate messages by the Reply Candidate Finder Engine 310 will be explained in greater detail below with reference to FIG. 8 of the drawings. FIG. 8 is a flowchart illustrating an example method for determining the candidate weights for the correlated candidate messages, according to various embodiments. FIG. 8 illustrates an example method 800 for determining the candidate weights for the correlated candidate messages. The method 800 may be invoked when the user as a sender types the input message on the input interface.

The method 800 comprises (at operation 802) predicting members in a group corpus or chat corpus who can reply to the sender's message using the chat weight table and the generated list of the candidate messages generated by the Message Correlation Engine 302.

At operation 804, the method 800 comprises assigning a candidate weight to each of the predicted members.

At operation 806, the method 800 comprises normalizing and scaling the assigned candidate weight with respect to the user's input message. As an example, the Reply Candidate Finder Engine 310 normalizes the candidate weight assigned to each of the predicted members and further scales the normalized value of the candidate weights. An example Table 7 is shown for the ease of the explanation of the normalized candidate weight with reference to messages in the friend group 500 of FIG. 5.

TABLE 7

| Candidate Messages | Candidate List | Normalized candidate weights |
| --- | --- | --- |
| Hey Mike, what am amazing football game it was!! | [Mike 94 w, Sam 2 w, Joy 2 w, Jack 10 w] | 10 W |
| Yes, It was an extraordinary football match. | [Mike 7 w, Sam 7 w, Joy 7 w, Jack 85 w] | 85 W |
| Will you play cricket wit me jack? | [Mike 10 w, Sam 2 w, Joy 2 w, Jack 90 w] | 90 W |

The example of the candidate weight table in Table 7 is shown for ease of explanation and is not limited to the information included in Table 7. The normalized candidate weight will vary depending on the input message and the number of members that can reply to the input message and may include any other information based on correlated candidate messages and the number of members in the group corpus or the chat corpus. The flow of the method 800 now proceeds to (step 808).

At operation 808, the method 800 comprises outputting the scaled and normalized value of the candidate weights to the adjustor 306. As an example, the Reply Candidate Finder Engine 310 outputs the scaled and normalized value of the candidate weights corresponding to each of the predicted candidates for the reply to the adjustor 306.

Functions performed by the Time Relevance Weight Engine 312 for the prediction of the set of correlated candidate messages, will be described in detail with respect to the example FIG. 5 of the drawings.

The Time Relevance Weight Engine 312 is configured to determine time-relevant weights for the correlated candidate messages based on a chat in focus attribute and multiple time attributes associated with the correlated candidate messages and the user's input message. In particular, the Time Relevance Weight Engine 312 predicts the correlated candidate messages that are relevant to the user's input message with respect to time. The Time Relevance Weight Engine 312 learns about the received and read timing of the correlated candidate messages, typing timing for the user input, and details related to the timing until when old candidate messages are read by the user through type in focus window and accordingly assigns time relevant weights to the correlated candidate messages. The Time Relevance Weight Engine 312 outputs the determined time-relevant weights to the adjustor 306.

Figure 9:
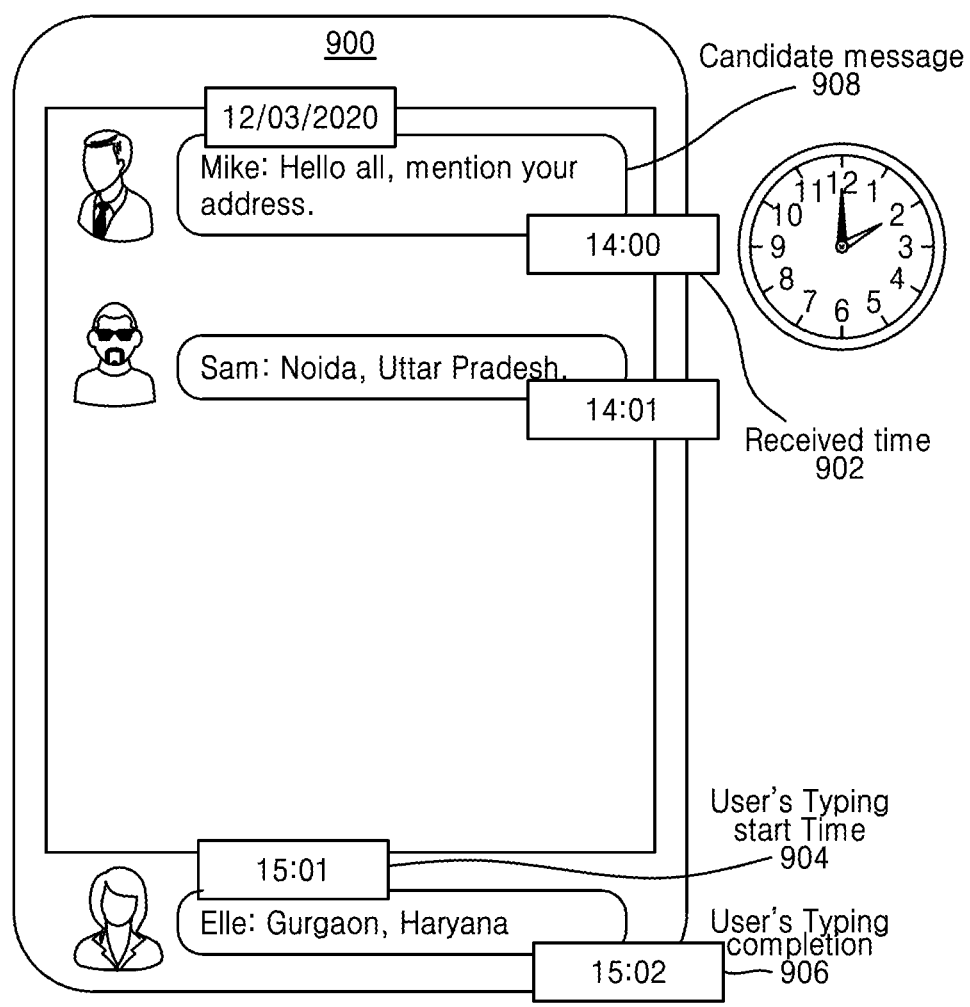
FIG. 9 is a diagram illustrating an example of the multiple time attributes and chat in focus attribute for determining the time relevant weights for the correlated candidate messages, according to various embodiments.

An example illustration of the multiple time attributes and chat in focus attribute for determining the time relevant weights will be explained in greater detail below with reference to FIG. 9. FIG. 9 is a diagram illustrating an example of the multiple time attributes and chat in focus attribute for determining the time relevant weights for the correlated candidate messages, according to various embodiments. FIG. 9 illustrates an example chat interface 900 in which multiple group members are chatting. According to FIG. 9, the Time Relevance Weight Engine 312 determines the multiple time attributes corresponding to the correlated candidate messages, for example, but not limited to, message received time, the message read time, the message read time difference, hours gap from the user's Input message, user's typing start time, and user's typing completion time. The Time Relevance Weight Engine 312 also determines whether the candidate message is visible or not on the display screen 320 displaying the chat interface 900 and captures the result of this determination as an attribute for determining the time-relevant weight. As an example, a candidate message 908, received time 902, user's typing start time 904, user's typing completion time 906 are shown in FIG. 9 within the chat interface 900.

The message read time difference corresponds to a difference between the message received time and the message read time. The hour gap corresponds to a number of hours taken by the user to reply to the candidate message and the chat in focus indicates the visibility of the candidate message in the chat interface. In the case, the candidate message is visible in the chat interface a higher time relevant weight is assigned to the candidate message by the Time Relevance Weight Engine 312.

An example Table 8 is shown for example representation of the candidate messages with the assigned time relevant weight with reference to the messages in the friend group 500 of FIG. 5.

The example of the time relevant weight table in the Table 8 is shown for ease of explanation and is not limited to the information included in the Table 8. The time relevant weight will vary depending on the multiple time attributes corresponding to the input message and the correlated candidate messages in the group corpus or the chat corpus.

The functions performed by the Query Satisfaction Predictor Engine 314 for the prediction of the set of correlated candidate messages, will be described in greater detail below with respect to the example illustrated in FIGS. 5 and 9.

The Query Satisfaction Predictor Engine 314 is configured to predict a total number of replies that can be received in response to the user's input message based on one or more query satisfaction parameters using a semi-supervised machine learning model. For example, the Query Satisfaction Predictor Engine 314 predicts the total number of replies that can be received in response to the user's input message based parameters like, but not limited to, a number of active members in the group corpus or the chat corpus, interest in the subject of the correlated candidate message, the user's mentioned in the group corpus or the chat corpus, and a group size of the group corpus or the chat corpus. Here, the interest in the subject of the correlated candidate message corresponds to an average number of members who replied on a similar subject.

Further, subsequent to the prediction of the total number of replies, the Query Satisfaction Predictor Engine 314 generates a query answerable index based on an actual number of replies received before inputting the user's input message in the input interface and the predicted total number of replies that can be received in response to the user's input message. In particular, the Query Satisfaction Predictor Engine 314 generates a query answerable index value corresponding to each of the correlated candidate messages. Thereafter, the Query Satisfaction Predictor Engine 314 determines and assigns query satisfaction weights for the correlated candidate messages based on the generated query answerable index. Furthermore, the Query Satisfaction Predictor Engine 314 outputs the query satisfaction weights to the adjustor 306. In addition, the Query Satisfaction Predictor Engine 314 also monitors the accuracy of determining query satisfaction weights and sets the priority corresponding to the correlated candidate messages accordingly. An example Table 9 is shown below for example representation of the candidate messages with the query answerable index values with reference to the messages in the friend group 500 of FIG. 5. The example of the query answerable index table in Table 9 is shown for ease of explanation and is not limited to the information included in Table 9. The query answerable index value will vary depending on the one or more query satisfaction parameters corresponding to the input message and the correlated candidate messages in the group corpus or the chat corpus.

TABLE 8

| Candidate Messages | Time Relevant Weight |
|---|---|
| Hey Mike, what am amazing football game it was!! | 65 W |
| Yes, It was an extraordinary football match. | 65 W |
| Will you play cricket wit me jack? | 90 W |

TABLE 9

| Candidate Messages | Query Answerable Index |
|---|---|
| Hey Mike, what am amazing football game it was!! | 10 W |
| Yes, It was an extraordinary football match. | 60 W |
| Will you play cricket wit me jack? | 80 W |

The functions performed by the User Behavior Engine 316 for the prediction of the set of correlated messages, will be described in greater detail below with respect to the example illustrated in FIG. 5.

The User Behavior Engine 316 generates a user behavior table (user behavior log) based on one or more behavioral parameters associated with dynamic user's behavior with the correlated candidate messages, senders of the correlated candidate messages, a pattern of reply timing. In particular, each of the correlated candidate messages and the user's input message may have a corresponding combined weight score which can change dynamically based on the user's behavior of reply to the messages in a chat group or the chat corpus. The User Behavior Engine 316 considers different factors based on the user's behavior of replying to a particular person for a particular query at a particular time to another particular person or a particular group and further adds various factors to map the candidate query to the user's input message intelligently.

The user behavior table is a table of messages of chat corpus and certain weights. The user behavior table includes information corresponding to a person's behavior, a subject behavior, a time behavior, and a group behavior associated with the correlated candidate messages. The information corresponding to the person's behavior indicates a relationship between two users in the group chat. The information corresponding to the subject behavior indicates a percentage of the user's talk time on each of the subjects included the correlated candidate messages. The information corresponding to the time behavior indicates a percentage of the user's reply to a specific person in the group chat at a specific time. The information corresponding to the group behavior indicates a priority of the group chat among chat groups.

The person behavior weight (PBW) calculated by User Behavior Engine 316 can be given as:

$$\text{Person behavior wight}(PBW) = X * \frac{(P1 + P2)}{Z} \quad (1)$$

Where, $$X = \frac{\text{numbers of sessions where user1 and user2 involved}}{\text{total numbers of chat sessions}}$$

P1=Total number of User1's reply to User2
P2=Total number of User2's reply to User1
Z=Total number of messages in group.

The Subject Behavior weight (SBW) calculated by User Behavior Engine 316 can be given as:

$$SBW(\text{subject} = X) = \frac{\text{User's messages on subject } X}{\text{Total messages on subject } X} \quad (2)$$

The Time behavior weight (TBW) calculated by User Behavior Engine 316 can be given as:

$$TBW\begin{pmatrix} \text{time slot} = X \\ \text{Person} = y \end{pmatrix} = \quad (3)$$

$$\frac{\text{Average number of User's messages on time slot } X}{\sum_{day=0}^{day=current}\text{Users message during day}/\text{Total days}}$$

The group behavior weight (GBW) calculated by User Behavior Engine 316 can be given as:

$$GBW = \frac{\text{User active time in chat group } i}{\text{User's total active time in all chat}} \times \quad (4)$$

$$\frac{\text{User active time in chat group } i}{\text{Total activity time in chat group } i}.$$

The User Behavior Engine 316 further determines behavior factors corresponding to the PBW, SBW, TBW, and GBW respectively. The Behavior Factors includes a dynamic Person Behavior Factor (PBF) corresponding to the PBW, a Subject Behavior Factor (SBF) corresponding to the SBW, a Time Behavior factor (TBF) corresponding to the TBW, and a Group Behavior Factor (GBF) corresponding to the GBW. The behavior factors determined by the User Behavior Engine 316 can be given as:

$$(5)$$

Behavior Factor =

$$\frac{\sqrt{\sum_{i=0}^{i=n}(\text{behavior weight of } i^{th} \text{ candidate message} - \text{mean of behavior})^2}}{\text{Total numbers of candidate message}}.$$

Further, the User Behavior Engine 316 determines behavioral weights for the correlated candidate messages based on the information included in the user behavior table. For example, the User Behavior Engine 316 learns about the user's behavior history of reply to the previously received messages, and maps the correlated candidate messages with the user's input message while taking into account weightages of different user behavioral dynamic factors. An example of the determined behavioral weights is shown in example Table 10 with reference to example candidate messages as shown in FIG. 5 of the drawings. The example Table 10 of the behavioral weights is shown for ease of explanation and is not limited to the information included in the Table 10. The behavioral weight values will vary depending on the behavior factors corresponding to the correlated candidate messages in the group corpus or the chat corpus.

TABLE 10

| Candidate Messages | PBW | SBW | TBW | GBW |
| --- | --- | --- | --- | --- |
| Hey Mike, what am amazing football game it was!! | 10 | 40 | 70 | 35 |
| Yes, It was an extraordinary football match. | 70 | 40 | 80 | 35 |
| Will you play cricket wit me jack? | 70 | 80 | 80 | 35 |

Further, the User Behavior Engine 316 scales determines behavioral weights in a specific range and outputs the determined behavioral weights to the adjustor 306. The behavioral weight determined by the User Behavior Engine 316 can be given as:

$$(6)$$

User Behavior weight =

$$\text{scale}\left[\frac{SBW \times SBF + TBW \times TBF + PBW \times PBF + GBW \times GBF}{4}\right]$$

Referring back again to FIG. 3, the operations performed by the adjustor 306 for generating the priority list of candidate messages will be described in greater detail below with reference to FIG. 10 and the candidate messages as shown in FIG. 5.

Figure 10:
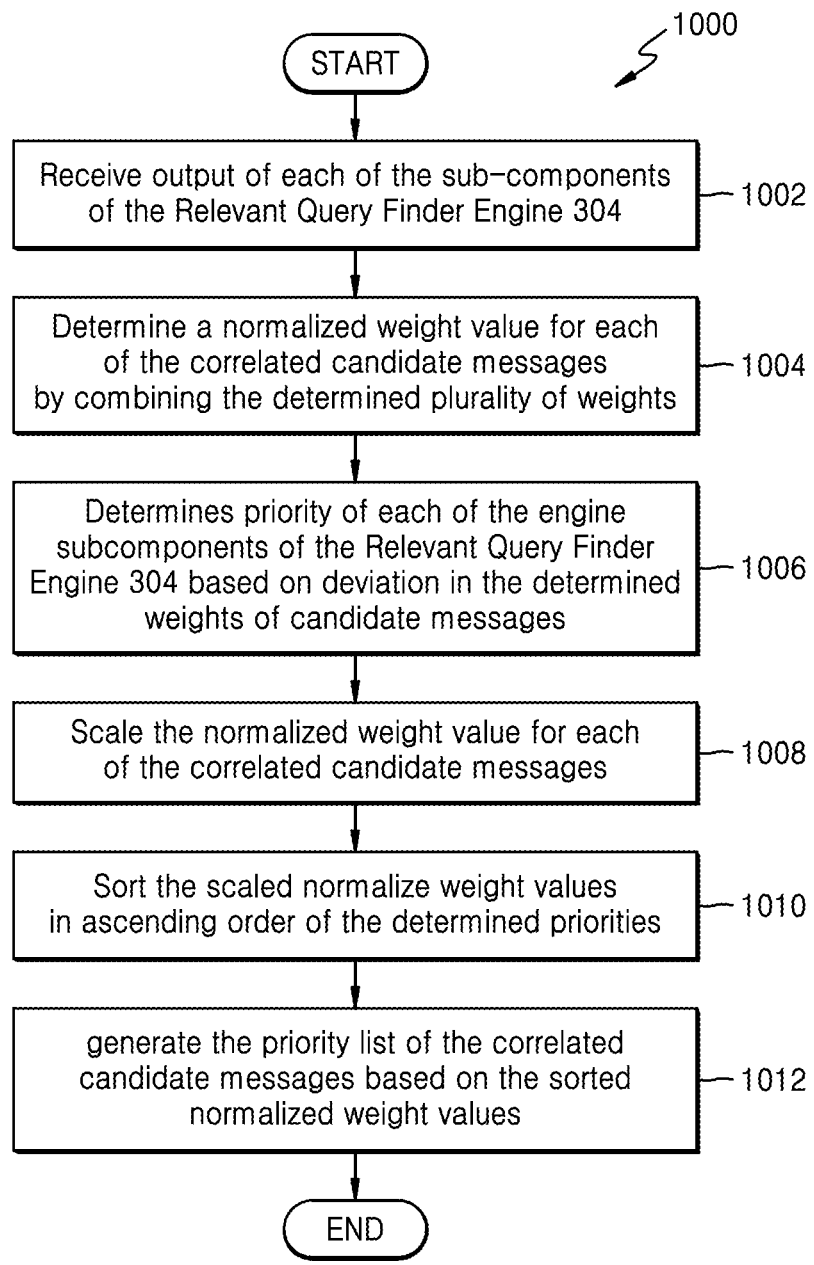
FIG. 10 is a flowchart illustrating an example method for generating the priority list of candidate messages by the adjustor of FIG. 3, according to various embodiments.

FIG. 10 is a flowchart illustrating an example method for generating the priority list of candidate messages by the adjustor 306 of FIG. 3, according to various embodiments. FIG. 10 illustrates a method 1000 for generating the priority list of candidate messages.

The method 1000 comprises (at operation 1002) receiving the output of each of the sub-components of the Relevant Query Finder Engine 304 including corresponding weights determined by the sub-components of the Relevant Query Finder Engine 304. For example, once the plurality of weights is determined and scaled by the Relevant Query Finder Engine 304, the Relevant Query Finder Engine 304 outputs the determined plurality of weights to the adjustor 306. The flow of the method 1000 now proceeds to (operation 1004). An example Table 11 representing the determined plurality of weights by the engine subcomponents of the Relevant Query Finder Engine 304 is shown below using the example messages of FIG. 5. The example Table 11 representing the determined plurality of weights is shown for ease of explanation and is not limited to the information included in Table 11. The determined plurality of weights depends on the relevance of the correlated candidate messages with respect to the user's input message.

TABLE 11

| Candidate Messages | Subject Relavant Weight | Normalized Candidate Weight | Time Relevant Weight | Query Answerable Index | User Behavior Weight |
|---|---|---|---|---|---|
| Hey Mike, what am amazing football game it was!! | 80 W | 10 W | 65 W | 20 W | 55 W |
| Yes, It was an extraordinary football match. | 80 W | 85 W | 65 W | 60 W | 85 W |
| Will you play cricket wit me jack? | 95 W | 90 W | 90 W | 80 W | 85 W |

At operation 1004, the method 1000 comprises determining a normalized weight value for each of the correlated candidate messages by combining the determined plurality of weights. As an example, the adjustor 306 combines the determined plurality of weights received from the Relevant Query Finder Engine 304 and further determines the normalized weight value for each of the correlated candidate messages based on the combined plurality of weights.

At operation 1006, the method 1000 comprises determining the priority of each of the engine sub-components of the Relevant Query Finder Engine 304 based on a deviation in the determined weights of candidate messages. As an example, the adjustor 306 reviews the weights of each subcomponent engine of the Relevant Query Finder Engine 304 and determines the priority of each engine based on deviation in the determined weights of candidate messages. For example, if the subject relevant weight is the same for all of the correlated candidate messages then a lower Priority value will be assigned. The adjustor learns this behavior as reinforcement learning.

At operation 1008, the method 1000 comprises scaling the normalized weight value for each of the correlated candidate messages. As an example, the adjustor 306 scales the determined normalized weight value for each of the correlated candidate messages in a specific range, for example, but not limited to, in a range between 1 to 100. The flow of the method 1000 now proceeds to (step 1010). An example of the normalized and scaled weight value is shown below in Table 12 with reference to Table 11 as shown above. The example Table 12 representing the normalized and scaled weight values is shown for ease of explanation and is not limited to the information included in Table 12. The normalized and scaled weight values vary depending upon the output of the engine sub-components of the Relevant Query Finder Engine 304.

TABLE 12

| Candidate Messages | Normalized Output |
|---|---|
| Hey Mike, what am amazing football game it was!! | 46 W |
| Yes, It was an extraordinary football match. | 75 W |
| Will you play cricket wit me jack? | 88 W |

At operation 1010, the method 1000 comprises sorting the scaled normalize weight values in ascending order of the determined priorities. As an example, the adjustor 306 sorts the scaled normalize weight values in increasing order of priority. A maximum normalized weight value among the scaled normalize weight values of the candidate message indicates the highest priority.

At operation 1012, the method 1000 comprises generating the priority list of the correlated candidate messages based on the sorted normalized weight values. As an example, the adjustor generates the priority list of the correlated candidate messages based on the sorted normalized weight values. The generating the priority list of the correlated candidate messages includes the predicted set of correlated candidate messages having a priority higher than the other candidate messages.

Various example scenarios are described below herein to show the advantage of the method and system of the present disclosure.

Figure 11:
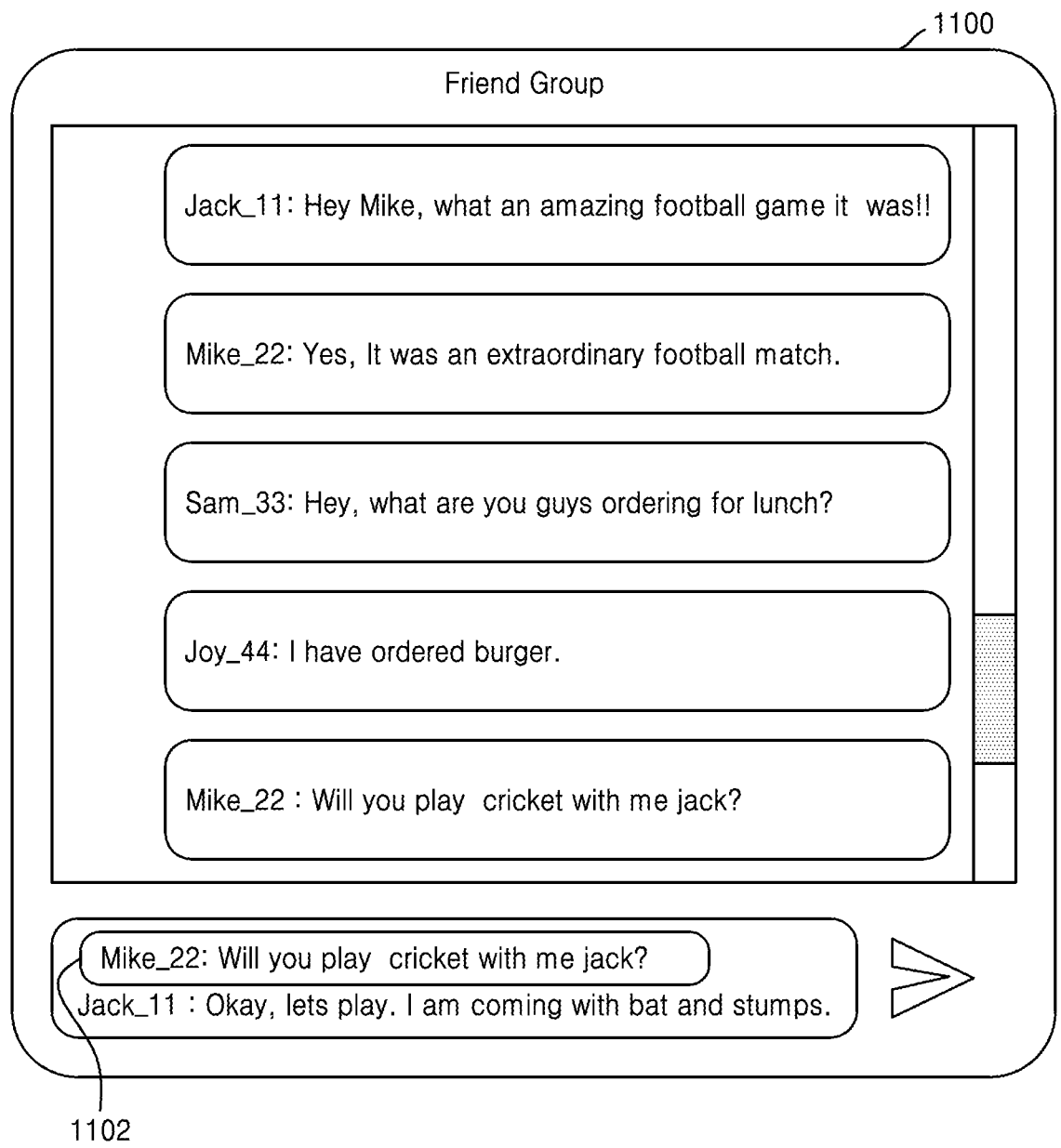
FIG. 11 is a diagram illustrating an example scenario representing an appropriate reply candidate for the user's input message with reference to the example messages of FIG. 5, according to various embodiments.

Referring to FIG. 11, FIG. 11 is a diagram illustrating an example scenario representing an appropriate reply candidate for the user's input message with reference to the example messages of FIG. 5, according to various embodiments. As shown in FIG. 11, the most appropriate candidate message 1102 is automatically pinned to the user which the user wants to reply to by the system 300. Therefore, the user does not need to manually search for the candidate message 1102 in the list of unread messages received in the group chat or chat corpus. Further, the method and system of the present disclosure automatically ping the message in the input interface of the chat window and therefore the user does need to search for the message which has not received the response. In view of the above-described example scenario, the user will not have any fear of missing the chat which needs an urgent response. Furthermore, the method and system of the present disclosure also helps to suggest topics of importance to the user when the user opens group chat windows with many messages.

Figure 12:
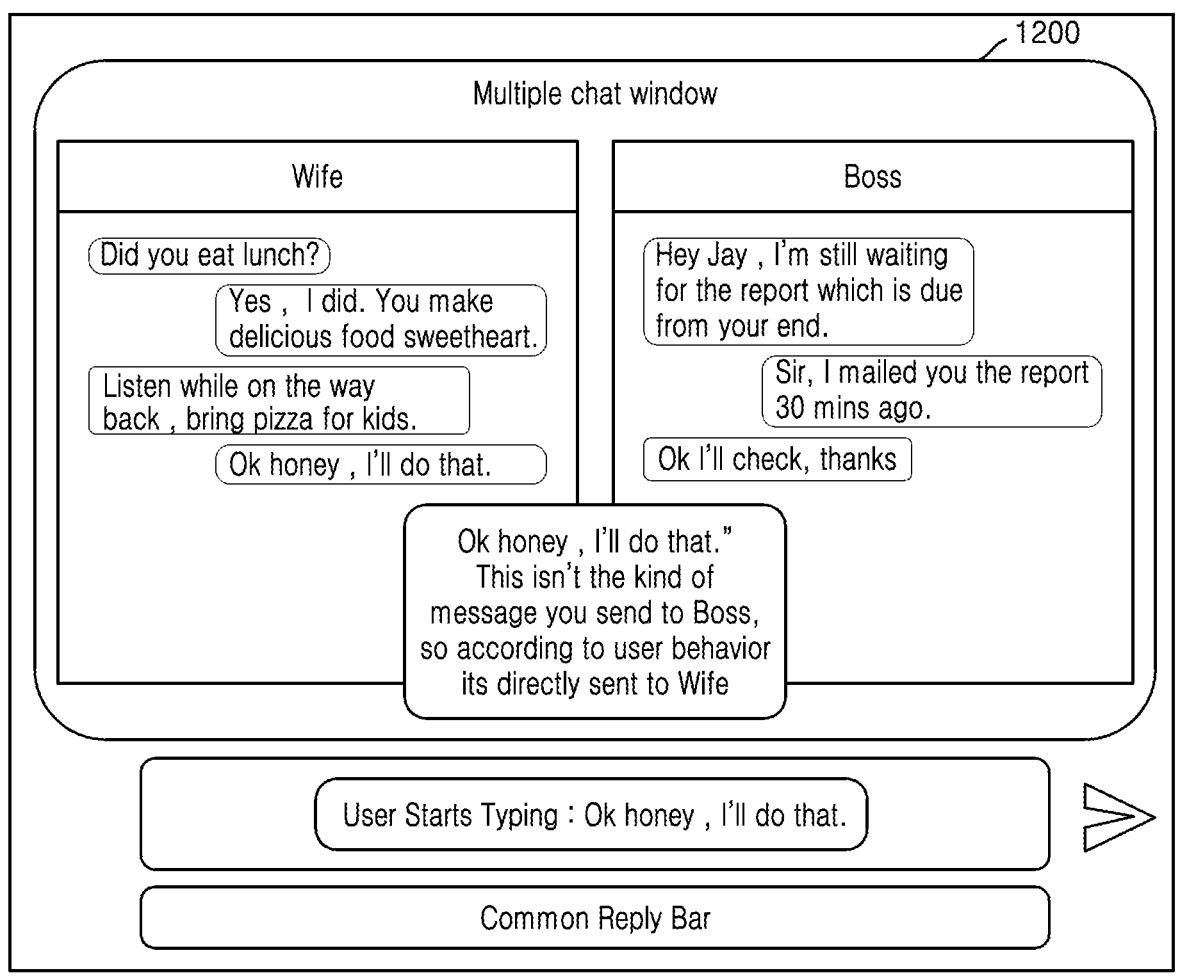
FIG. 12 is a diagram illustrating an example scenario representing a multiple chat window including a separate individual chat group, according to various embodiments.

Referring to FIG. 12, FIG. 12 is a diagram illustrating an example scenario representing a multiple chat window including a separate individual chat group, according to various embodiments. As shown in FIG. 12, there are two separate individual groups Wife and boss with whom the user is chatting in the multiple chat window 1200. The method and system of the present disclosure prevents the message from being sent to the boss when the user sends a message to the boss instead of the wife by mistake and redirects the message to the chat window of the wife who is the appropriate candidate for the message to be sent by the user. Therefore, an occurrence of unintentionally sending the wrong message in the wrong chat window can be prevented/reduced.

Further, various example use cases will be explained in greater detail below herein with regard to the system 300 and the method 400 for the prediction of user's response in the multi-window environment or the single window environment.

Figure 13:
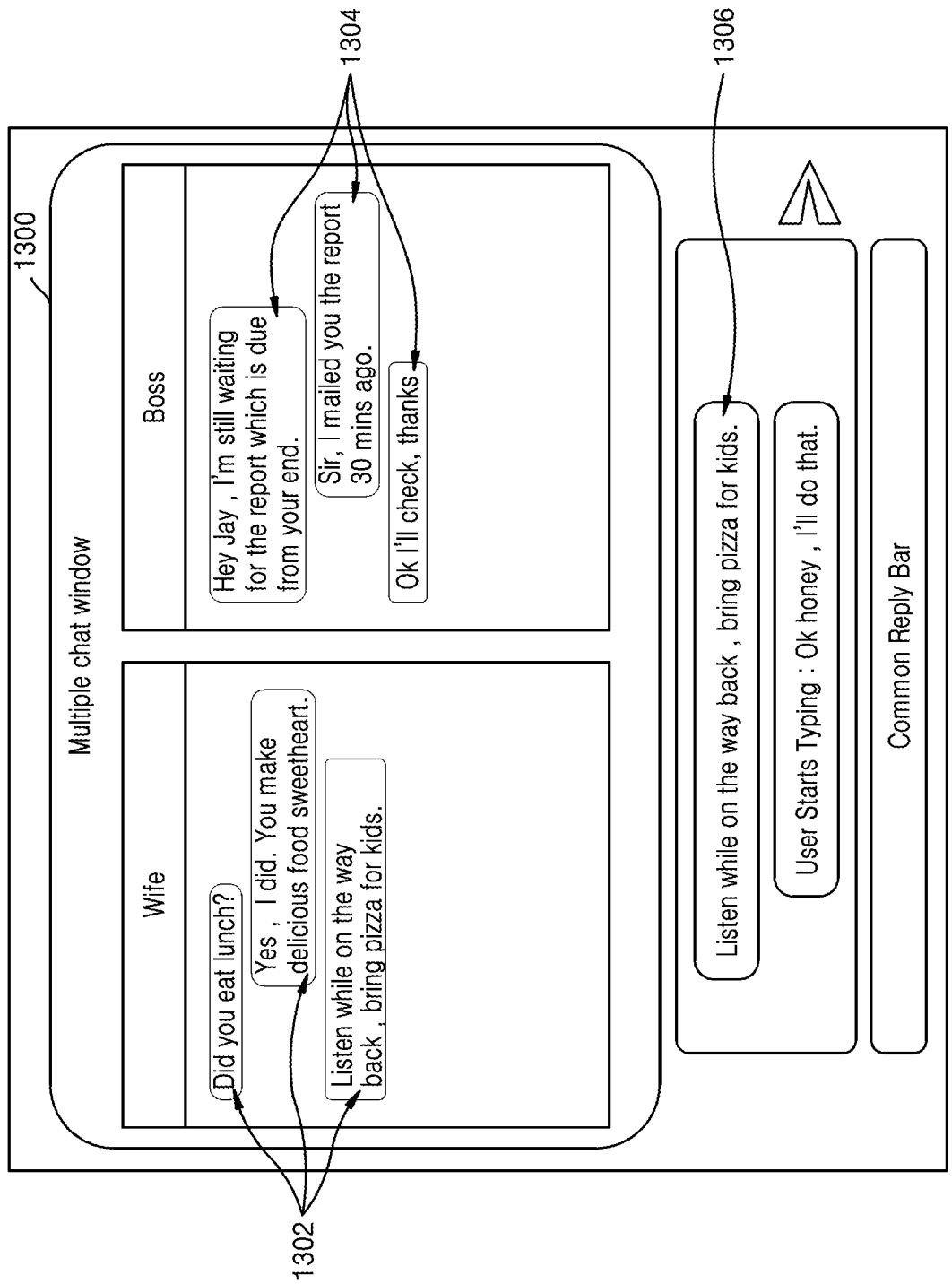
FIG. 13 is a diagram illustrating a first use case example of Multiple chat windows query finder, according to various embodiments.

Referring now to FIG. 13, FIG. 13 is a diagram illustrating an example first use case example of Multiple chat windows query finder, according to various embodiments. FIG. 13 illustrates an example of a multi chat window 1300 including a first chat window between the user and the wife of the user, and a second chat window between the user and the boss of the user. Multiple chats are going on in these chat windows and at some point of time, the user may unable to find the message to which the user wanted to replied and may be confused and scared of fearing sending a wrong message to the wrong person. The system and method can help the user to avoid confusion and can scan all the messages in the multiple chat windows and pins the most appropriate candidate message for the user input typed reply.

As shown in FIG. 13, there are a first set of candidate messages 1302 in the first chat window and a second set of candidate messages 1304 in the second chat window. When the user starts typing the input message, the disclosed method and system as described above can find a query candidate for the reply and pins the suitable query candidate for reply in the user interface. According to FIG. 13, the query candidate 1306 is automatically pinned to the input interface for the reply on the display screen 320 by the system 300 in accordance with the method 400. Accordingly, the present disclosure can be used to find query candidates in the multiple chat windows platform.

Figure 14:
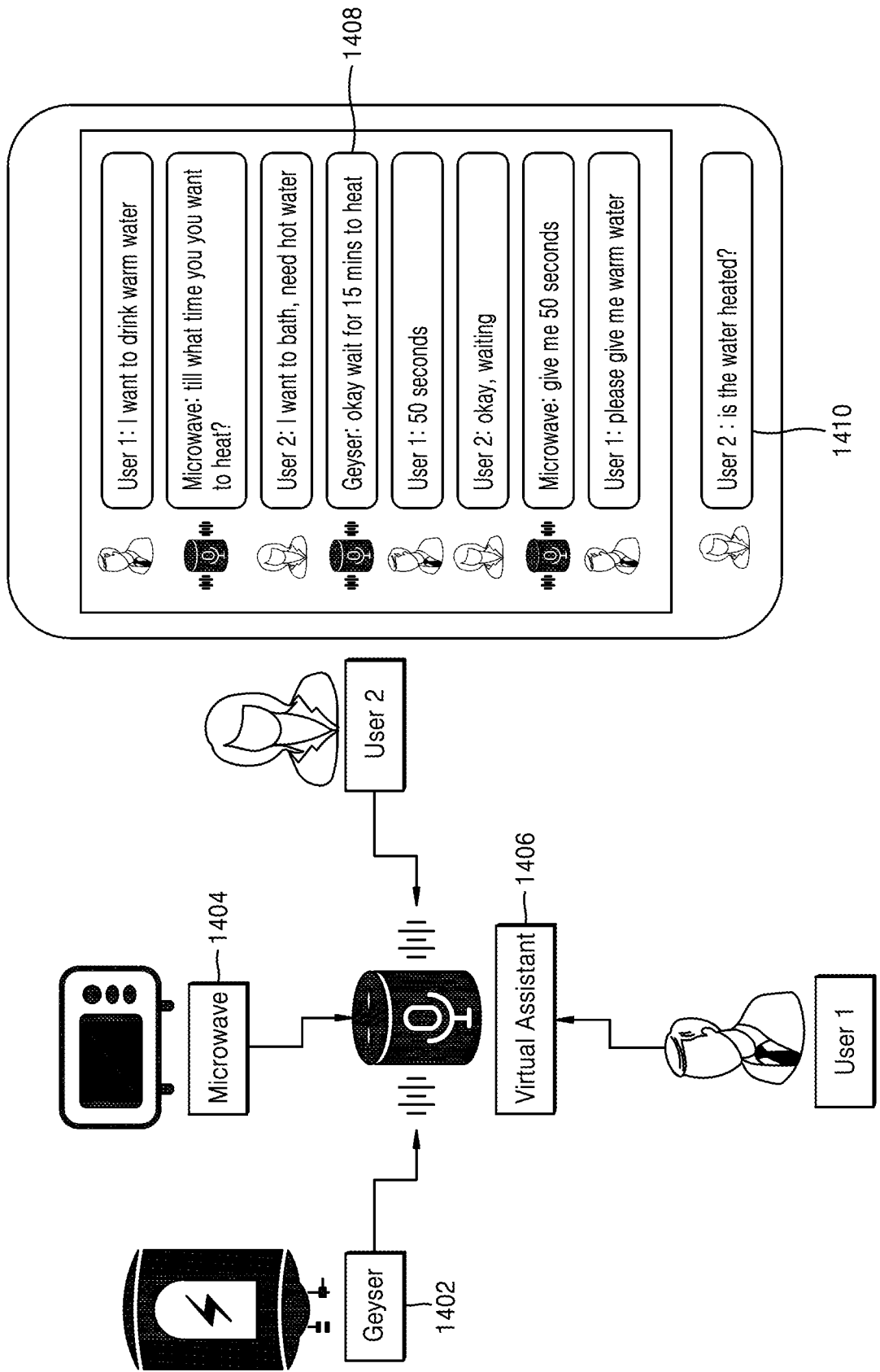
FIG. 14 is a diagram illustrating a second use case example of query finder in an Internet of Things (IoT) environment, according to various embodiments.

Referring now to FIG. 14, FIG. 14 is a diagram illustrating an example second use case example of query finder in an Internet of Things (IoT) environment, according to various embodiments. FIG. 14 illustrates multiple IoT devices (geyser 1402, microwave 1404, and virtual assistant 1406) in an IoT environment and two users (user 1 and user 2) are communicating with these IoT devices. During this communication between the users and the IoT device, there might occur a situation when a command given to one of the IoT devices can be fulfilled by another IoT device, so there may occur confusion and wrong operation may be performed by the IoT devices. The method and system of the present disclosure suggests the best candidate device to which the command needs to be given to the user by scanning the history of communication of the user with each of the IoT devices. As shown in FIG. 14, for example, a candidate message 1408 corresponding to the geyser 1402 is suggested to user 2 as the best candidate device in response to query 1410 of user 2. The example used herein is not limited in scope and are shown for ease of explanation.

Figure 15:
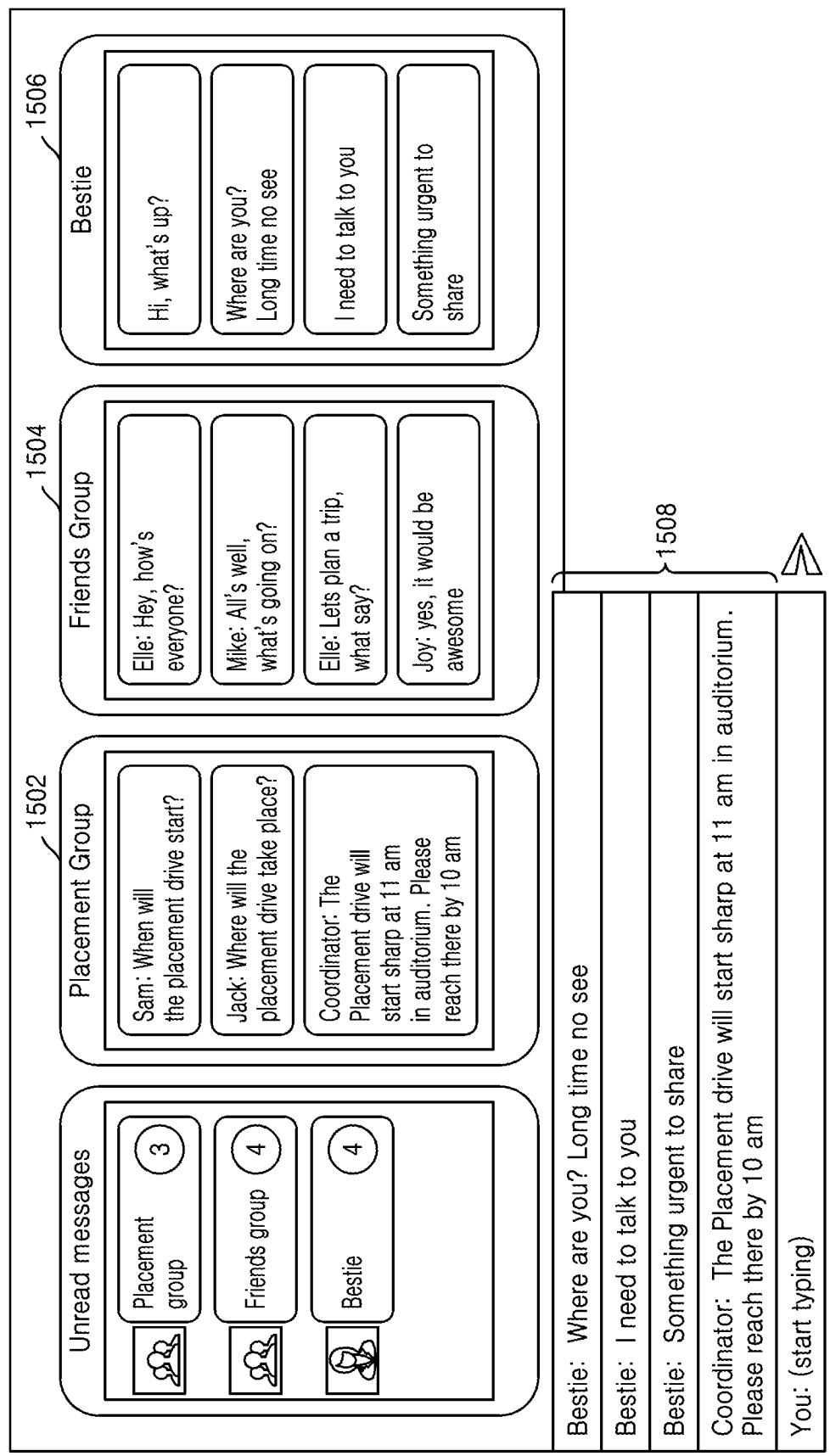
FIG. 15 is a diagram illustrating a third use case example of a priority-based query finder, according to various embodiments.

Referring now to FIG. 15, FIG. 15 is a diagram illustrating an example third use case example of a priority-based query finder, according to various embodiments. FIG. 15 illustrates a chat application 1500 displaying multiple unread messages in multiple chat windows (Placement Group 1502, Friends Group 1504, and Bestie 1506). Considering a situation when the user opens the chat application 1500 after a break. The user at that time may get confused about the important messages that need to be replied first and how to find the important messages. It may also become difficult for the user to scan each chat window and find those important messages. In such a situation the method and system of the present disclosure provides a list of the candidate messages to the user according to the highest priority based on previous user interactions and query satisfiable index of the candidate messages when the user starts typing in the input interface of the application 1500. As an example, a list of candidate messages (1508) is pinned above the input interface in which the user is typing. The example used herein is not limited in scope and are simply shown for ease of explanation.

Figure 16:
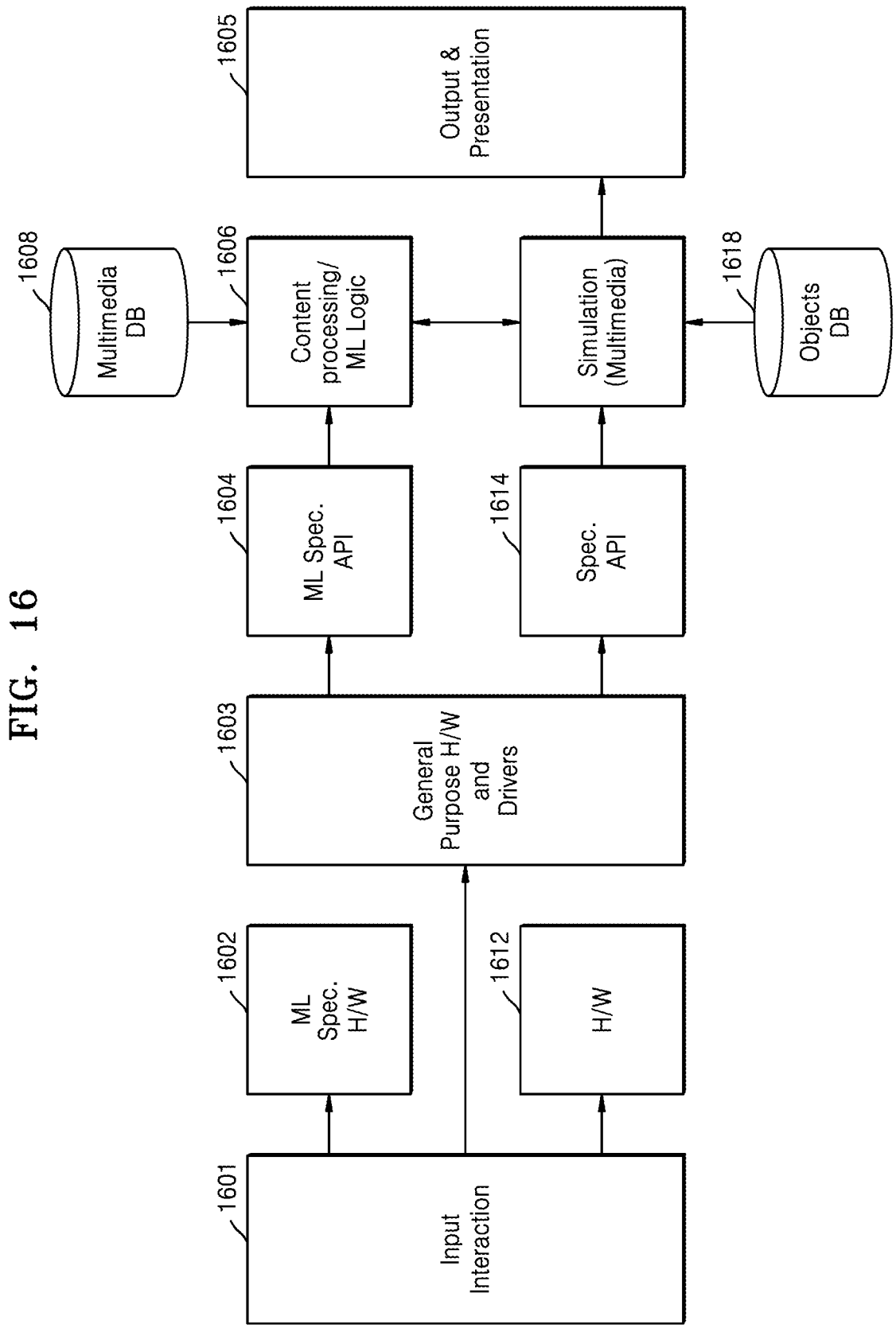
FIG. 16 is a block diagram illustrating an example configuration of the system, according to various embodiments.

Referring now to FIG. 16 of the Drawings, FIG. 16 is a block diagram illustrating an example configuration of the system 300 to provide tools and development environment described herein according to various embodiments. FIG. 16 is merely a non-limiting example, and it will be appreciated that many other architectures may be implemented to facilitate the functionality described herein. The architecture may be executing on hardware such as a computing machine 1600 of FIG. 16 that includes, among other things, processors, memory, and various application-specific hardware components.

The architecture 1600 may include an operating-system, libraries, frameworks, or middleware. The operating system may manage hardware resources and provide common services. The operating system may include, for example, a kernel, services, and drivers defining a hardware interface layer. The drivers may be responsible for controlling or interfacing with the underlying hardware. For instance, the drivers may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

A hardware interface layer includes libraries which may include system libraries such as file-system (e.g., C standard library) that may provide functions such as memory allocation functions, string manipulation functions, mathematic functions, and the like. In addition, the libraries may include API libraries such as audio-visual media libraries (e.g., multimedia data libraries to support presentation and manipulation of various media formats such as MPEG4, H.264, MP3, AAC, AMR, JPG, PNG), database libraries (e.g., SQLite that may provide various relational database functions), web libraries (e.g. WebKit that may provide web browsing functionality), and the like.

A middleware may provide a higher-level common infrastructure such as various graphic user interface (GUI) functions, high-level resource management, high-level location services, and so forth. The middleware may provide a broad spectrum of other APIs that may be utilized by the applications or other software components/modules, some of which may be specific to a particular operating system or platform.

The term "module" used in this disclosure may refer to a certain unit that includes one of hardware, software, and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one ASIC (Application-Specific Integrated Circuit) chip, FPGAs (Field-Programmable Gate Arrays), and programmable-logic device, which have been known or are to be developed.

Further, the architecture 1600 illustrates an example aggregation of audio/video processing device-based mechanisms and ML/NLP based mechanism in accordance with an embodiment of the present subject matter. A user-interface is defined as input and interaction 1601 refers to overall input. It can include one or more of the following-touch screen, microphone, camera, etc. A first hardware module 1602 illustrates example specialized hardware for ML/NLP based mechanisms. As an example, the first hardware module 1602 comprises one or more neural processors, FPGA, DSP, GPU, etc.

A second hardware module 1612 illustrates example specialized hardware for executing the data splitting and transfer. ML/NLP based frameworks and APIs 1604 correspond to the hardware interface layer for executing the ML/NLP logic 1606 based on the underlying hardware. In an example, the frameworks may be one or more or the following-Tensorflow, Café, NLTK, GenSim, ARM Compute etc. Simulation frameworks and APIs 1614 may include one or more of—Audio Core, Audio Kit, Unity, Unreal etc.

A database 1608 illustrates an example pre-trained database. The database 1608 may be remotely accessible through cloud by the ML/NLP logic 1606. In other example, the database 2408 may partly reside on cloud and partly on-device based on usage statistics.

Another database 1618 refers the memory. The database 1618 may be remotely accessible through cloud. In other example, the database 1618 may partly reside on the cloud and partly on-device based on usage statistics.

A rendering module 1605 is provided for rendering audio output and trigger further utility operations. The rendering module 1605 may be manifested as a display cum touch screen, monitor, speaker, projection screen, etc.

Figure 17:
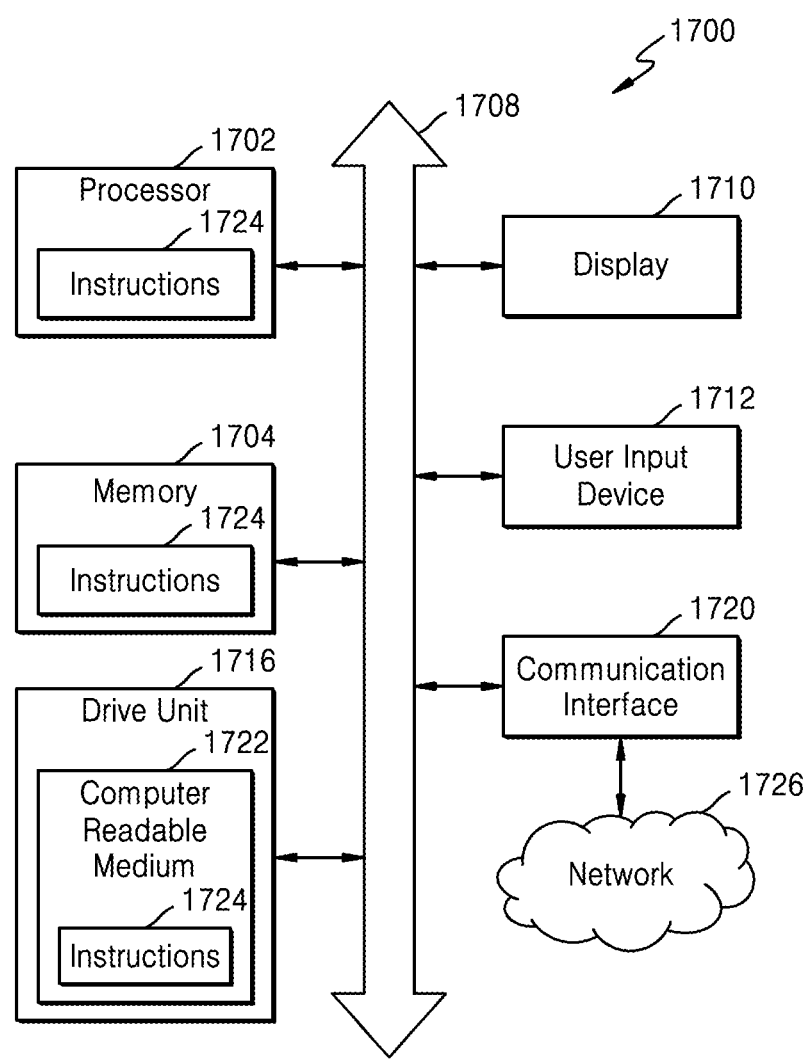
FIG. 17 is a block diagram illustrating an example configuration of the system according to various embodiments.

A general-purpose hardware and driver module 1603 corresponds to the computing device 1700 as referred in FIG. 17 and instantiates drivers for the general purpose hardware units as well as the application-specific units (1602, 1612).

In an example, the ML mechanism underlying the present architecture 1600 may be remotely accessible and cloud-based, thereby being remotely accessible through a network connection. An audio/video processing device may be configured for remotely accessing the NLP/ML modules and simulation modules may comprise skeleton elements such as a microphone, a camera a screen/monitor, a speaker etc.

Further, at-least one of the plurality of modules of mesh network may be implemented through AI based on an ML/NLP logic 1606. A function associated with AI may be performed through the non-volatile memory, the volatile memory, and the processor of the first hardware module 1602 e.g., specialized hardware for ML/NLP based mechanisms. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The aforesaid processors collectively correspond to the processor 1702 of FIG. 17.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Being provided through learning may refer, for example, to, by applying a learning logic/technique to a plurality of learning data, a predefined operating rule or AI model of the desired characteristic being made. "Obtained by training" may refer, for example, to a predefined operation rule or artificial intelligence model configured to perform a desired feature (or purpose) being obtained by training a basic artificial intelligence model with multiple pieces of training data by a training technique. The learning may be performed in a device (e.g., the architecture 1600 or the device 1700) itself in which AI according to an embodiment is performed, and/or may be implemented through a separate server/system. "

The AI model may include a plurality of neural network layers. Each layer has a plurality of weight values, and performs a neural network layer operation through calculation between a result of computation of a previous-layer and an operation of a plurality of weights. Examples of neural-networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The ML/NLP logic 1606 is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

Referring now to FIG. 17, FIG. 17 is a diagram illustrating an example configuration of the system according to various embodiments. The computer system 1700 can include a set of instructions that can be executed to cause the computer system 1700 to perform any one or more of the methods disclosed. The computer system 1700 may operate as a standalone device or may be connected, e.g., using a network, to other computer systems or peripheral devices.

In a networked deployment, the computer system 1700 may operate in the capacity of a server or as a client user computer in a server-client user network environment, or as a peer computer system in a peer-to-peer (or distributed) network environment. The computer system 1700 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1700 is illustrated, the term "system" shall also be taken to include any collection of systems or sub-systems that individually or jointly execute a set, or multiple sets, of instructions to perform one or more computer functions.

The computer system 1700 may include a processor (e.g., including processing circuitry) 1702 e.g., a central processing unit (CPU), a graphics processing unit (GPU), or both. The processor 1702 may be a component in a variety of systems. For example, the processor 1702 may be part of a standard personal computer or a workstation. The processor 1702 may be one or more general processors, digital signal processors, application-specific integrated circuits, field-programmable gate arrays, servers, networks, digital circuits, analog circuits, combinations thereof, or other now known or later developed devices for analyzing and processing data. The processor 1702 may implement a software program, such as code generated manually (e.g., programmed).

The computer system 1700 may include a memory 1704, such as a memory 1704 that can communicate via a bus 1708. The memory 1704 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 1704 includes a cache or random access memory for the processor 1702. In alternative examples, the memory 1704 is separate from the processor 1702, such as a cache memory of a processor, the system memory, or other memory. The memory 1704 may be an external storage device or database for storing data. The memory 1704 is operable to store instructions executable by the processor 1702. The functions, acts or tasks illustrated in the figures or described may be performed by the programmed processor 1702 for executing the instructions stored in the memory 1704. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1700 may or may not further include a display unit 1710, such as a liquid crystal display (LCD), an organic light-emitting diode (OLED), a flat panel display, a solid-state display, a cathode ray tube (CRT), a projector, a printer or other now known or later developed display device for outputting determined information. The display 1710 may act as an interface for the user to see the functioning of the processor 1702, or specifically as an interface with the software stored in the memory 1704 or the drive unit 1716.

Additionally, the computer system 1700 may include an input device (e.g., including input circuitry) 1712 configured to allow a user to interact with any of the components of system 1700. The computer system 1700 may also include a disk or optical drive unit 1716. The disk drive unit 1716 may include a computer-readable medium 1722 in which one or more sets of instructions 1724, e.g. software, can be embedded. Further, the instructions 1724 may embody one or more of the methods or logic as described. In an example, the instructions 1724 may reside completely, or at least partially, within the memory 1704 or within the processor 1702 during execution by the computer system 1700.

The present disclosure contemplates a computer-readable medium that includes instructions 1724 or receives and executes instructions 1724 responsive to a propagated signal so that a device connected to a network 1726 can communicate voice, video, audio, images, or any other data over the network 1726. Further, the instructions 1724 may be transmitted or received over the network 1726 via a communication port or interface 1720 or using a bus 1708. The communication port or interface 1720 may be a part of the processor 1702 or may be a separate component. The communication port 1720 may be created in software or may be a physical connection in hardware. The communication port 1720 may be configured to connect with a network 1726, external media, the display 1710, or any other components in system 1700, or combinations thereof. The connection with the network 1726 may be a physical connection, such as a wired Ethernet connection or may be established wirelessly as discussed later. Likewise, the additional connections with other components of the system 1700 may be physical or may be established wirelessly. The network 1726 may alternatively be directly connected to the bus 1708.

The network 1726 may include wired networks, wireless networks, Ethernet AVB networks, or combinations thereof. The wireless network may be a cellular telephone network, an 802.11, 802.16, 802.20, 802.1Q or WiMax network. Further, the network 1726 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

While specific language has been used to describe the disclosure, any limitations arising on account of the same are not intended. As would be apparent to a person in the art, various working modifications may be made to the method in order to implement the disclosure.

The drawings and the forgoing description give examples of embodiments. Those skilled in the art will appreciate that one or more of the described elements may well be combined into a single functional element. It will be understood that various elements may be split into multiple functional elements. Elements from one embodiment may be added to another embodiment. For example, orders of processes described herein may be changed and are not limited to the manner described herein.

Moreover, the actions of any flowchart need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the disclosure or not, such as differences in structure, dimension, and use of material, are possible. The scope of embodiments is at least as broad as given by the following claims.

While the disclosure has been illustrated and described with reference to various example embodiments, it will be understood that the various example embodiments are intended to be illustrative, not limiting. It will be further understood by those skilled in the art that various changes in form and detail without departing from the true spirit and full scope of the disclosure including the appended claims and their equivalents. It will also be understood that any of the embodiment(s) described herein may be used in conjunction with any other embodiment(s) described herein.

What is claimed is:

1. A method for predicting a response of a user in a multi-user environment, comprising:
    displaying, on a display screen, a user interface (UI) for inputting a message corresponding to one of at least one received message or a group of received messages from one or more contacts in one of a single window environment or a multi-window environment;
    generating, by a first processing engine, a list of correlated candidate messages associated with an input message based on one of the at least one received message or the group of received messages;
    predicting, by a second processing engine, a set of correlated candidate messages relevant to the input message from the list of correlated candidate messages;
    determining, by the second processing engine, a plurality of weights for each of the correlated candidate messages in the generated list of correlated candidate messages based on subject of the input message, at least one of query satisfaction parameters or behavioral parameters, and at least one of user's potential to be a candidate for reply or a plurality of time attributes, and a message correlation weight for each of the correlated candidate messages in the generated list of correlated candidate messages by combining the determined plurality of weights for the respective correlated candidate message;
    generating, by a third processing engine, a priority list of candidate messages including the predicted set of correlated candidate messages based on the message correlation weights of the correlated candidate messages; and
    displaying, on the display screen, at least one of an appropriate candidate message or a list of the appropriate candidate messages based on a priority associated with the appropriate candidate messages in the generated priority list of candidate messages,
    wherein the plurality of weights includes subject weights, at least one of query satisfaction weights or behavioral weights, and at least one of candidate weights or time-relevant weights corresponding to the correlated candidate messages.

2. The method as claimed in claim 1, further comprising:
    generating, by the first processing engine, a chat log including information corresponding to at least one of message ID and sender ID, message description corresponding to the at least one message ID and sender ID, and a timestamp corresponding to the at least one message ID and sender ID; and
    generating, by the first processing engine, a chat weight log for the correlated candidate messages based on the information in the chat log.

3. The method as claimed in claim 1, wherein the plurality of weights includes candidate weights, time-relevant weights, query satisfaction weights, and behavioral weights corresponding to the correlated candidate messages.

4. The method as claimed in claim 1, wherein, the prediction of the set of correlated candidate messages by the second processing engine comprises:
    determining a subject of the input message relevant to each of the correlated candidate messages using a subject predictor machine learning model; and
    assigning subject weights corresponding to the correlated candidate messages based on a correlation of the determined subject with the correlated candidate messages.

5. The method as claimed in claim 1, wherein, the prediction of the set of correlated candidate messages by the second processing engine, comprises:
    identifying and tagging, based on a plurality of parameters, the correlated candidate messages with ranked name entities that can potentially reply to the input message, wherein the plurality of parameters includes at least one of user's mention, user's participation, and a type of the corresponding correlated candidate messages; and
    determining candidate weights for the correlated candidate messages based on the identification and the tagging.

6. The method as claimed in claim 1, wherein, the prediction of the set of correlated candidate messages by the second processing engine, comprises determining time relevant weights to the correlated candidate messages based on a first plurality of time attributes associated with the correlated candidate messages, a second plurality of time attributes associated with the input message, and a chat in focus attribute.

7. The method as claimed in claim 1, wherein, the prediction of the set of correlated candidate messages by the second processing engine, comprises:
    predicting a total number of replies that can be received in response to the input message based on a plurality of query satisfaction parameters;
    generating a query answerable index based on an actual number of replies received before the input message and the prediction of the total number of replies; and
    determining query satisfaction weights for the correlated candidate messages based on the generated query answerable index.

8. The method as claimed in claim 1, wherein, the prediction of the set of correlated candidate messages by the second processing engine, comprises:
    generating a user behavior log based on a plurality of behavioral parameters associated with dynamic user's behavior with the correlated candidate messages, senders of the correlated candidate messages, a pattern of reply timing, wherein the user behavior log includes information corresponding to person behavior, subject behavior, time behavior, and group behavior associated with the correlated candidate messages; and
    determining behavioral weights for the correlated candidate messages based on the information included in the user behavior log.

9. The method as claimed in claim 8, wherein
    the information corresponding to the person behavior indicates a relationship between two users in a group chat,
    the information corresponding to the subject behavior indicates a percentage of talk time on subject included in the correlated candidate messages,
    the information corresponding to the time behavior indicates a percentage of reply to a specific person in the group chat at a specific time, and
    the information corresponding to the group behavior indicates a priority of the group chat among chat groups.

10. The method as claimed in claim 2, further comprising:
    determining, by the third processing engine, a normalized weight value for each of the correlated candidate messages by combining the determined plurality of weights;

scaling, by the third processing engine, the normalized weight value for each of the correlated candidate messages;

sorting, by the third processing engine, the scaled normalize weight values in ascending order of priority, wherein a maximum normalize weight value among the scaled normalize weight values indicates a highest priority; and generating, by the third processing engine, the priority list of candidate messages including the predicted set of correlated candidate messages based on the sorted normalized weight values.

11. The method as claimed in claim 1, wherein, the generation of the list of correlated candidate messages by the first processing engine, comprises:
correlating one of the at least one received message or the group of received messages with the input message based on a relationship between at least one of token features, word embedding, and semantics of the input message and one of the at least one received message or the group of received messages;
calculating a correlation weight of the at least one received message or each message in the group of received messages based on the correlation;
classifying, as correlated candidate messages, candidate messages with higher correlation weight among one of the at least one received message or the group of received messages based on the calculated correlation weight and a time threshold corresponding to the input message; and
generating the list of correlated candidate messages based on the classification.

12. A system configured to predict a response in a multi-user environment, comprising:
a display engine, comprising processing circuitry, configured to display, on a display screen, a user interface (UI) for receiving an input message corresponding to one of at least one received message or a group of received messages from one or more contacts in one of a single window environment or a multi-window environment;
a first processing engine, comprising processing circuitry, configured to generate a list of correlated candidate messages associated with an input message based on one of the at least one received message or the group of received messages;
a second processing engine, comprising processing circuitry, configured to:
predict a set of correlated candidate messages relevant to the input message from the list of correlated candidate messages, and
determine a plurality of weights for each of the correlated candidate messages in the generated list of correlated candidate messages based on subject of the input message, at least one of query satisfaction parameters or behavioral parameters, and at least one of user's potential to be a candidate for reply or a plurality of time attributes and a message correlation weight for each of the correlated candidate messages in the generated list of correlated candidate messages by combining the determined plurality of weights for the respective correlated candidate message; and
a third processing engine, comprising processing circuitry, configured to generate a priority list of candidate messages including the predicted set of correlated candidate messages based on the message correlation weights of the correlated candidate messages, wherein the display engine is further configured to display, on the display screen, at least one of an appropriate candidate message or a list of the appropriate candidate messages based on a priority associated with the appropriate candidate messages in the generated priority list of candidate messages,
wherein the plurality of weights includes subject weights, at least one of query satisfaction weights or behavioral weights, and at least one of candidate weights or time-relevant weights corresponding to the correlated candidate messages.

13. The system as claimed in claim 12, wherein the first processing engine is further configured to:
generate a chat log including information corresponding to at least one of message ID and sender ID, message description corresponding to the at least one message ID and sender ID, and a timestamp corresponding to the at least one message ID and sender ID, and
generate a chat weight log for the correlated candidate messages based on the information in the chat log.

14. The system as claimed in claim 12, wherein
the plurality of weights includes candidate weights, time-relevant weights, query satisfaction weights, and behavioral weights corresponding to the correlated candidate messages.

15. The system as claimed in claim 12, wherein, for the prediction of the set of correlated candidate messages, the second processing engine is further configured to:
determine a subject of the input message relevant to each of the correlated candidate messages using a subject predictor machine learning model; and
assign subject weights corresponding to the correlated candidate messages based on a correlation of the determined subject with the correlated candidate messages.

16. The system as claimed in claim 12, wherein, for the prediction of the set of correlated candidate messages, the second processing engine is further configured to:
identify and tag, based on a plurality of parameters, the correlated candidate messages with ranked name entities that can potentially reply to the input message, wherein the plurality of parameters includes at least one of user's mention, user's participation, and a type of the corresponding correlated candidate messages; and
determine candidate weights for the correlated candidate messages based on the identification and the tagging of the correlated candidate messages.

17. The system as claimed in claim 12, wherein, for the prediction of the set of correlated candidate messages, the second processing engine is further configured to determine time relevant weights for the correlated candidate messages based on a first plurality of time attributes associated with the correlated candidate messages, a second plurality of time attributes associated with the input message, and a chat in focus attribute.

18. The system as claimed in claim 12, wherein, for the prediction of the set of correlated candidate messages, the second processing engine is further configured to:
predict a total number of replies that can be received in response to the input message based on a plurality of query satisfaction parameters;
generate a query answerable index based on an actual number of replies received before the input message and the prediction of the total number of replies; and
determine query satisfaction weights for the correlated candidate messages based on the generated query answerable index.

19. The system as claimed in claim 12, wherein, for the prediction of the set of correlated candidate messages, the second processing engine is further configured to:

generate a user behavior log based on a plurality of behavioral parameters associated with dynamic user's behavior with the correlated candidate messages, senders of the correlated candidate messages, a pattern of reply timing, wherein the user behavior log includes information corresponding to person behavior, subject behavior, time behavior, and group behavior associated with the correlated candidate messages; and determine behavioral weights for the correlated candidate messages based on the information included in the user behavior log.

20. The system as claimed in claim 12, wherein, for the generation of the list of correlated candidate messages, the first processing engine is further configured to:

correlate one of the at least one received message or the group of received messages with the input message based on a relationship between at least one of token features, word embedding, and semantics of the input message and one of the at least one received message or the group of received messages;

calculate a correlation weight of the at least one received message or each message in the group of received messages based on the correlation;

classify, as correlated candidate messages, candidate messages with higher correlation weight among one of the at least one received message or the group of received messages based on the calculated correlation weight and a time threshold corresponding to the input message; and generate the list of correlated candidate messages based on the classification.

\* \* \* \* \*